(12) United States Patent
Huang et al.

(10) Patent No.: US 7,804,915 B2
(45) Date of Patent: Sep. 28, 2010

(54) DISTORTION COMPENSATION CIRCUIT AND METHOD

(75) Inventors: Xinping Huang, Ottawa (CA); Mario Caron, Gatineau (CA)

(73) Assignee: Her Majesty the Queen in right of Canada, as represented by the Minister of Industry, Through Communications Research Centre Canada, Ottawa (CA)

( * ) Notice: Subject to any disclaimer, the term of this patent is extended or adjusted under 35 U.S.C. 154(b) by 0 days.

(21) Appl. No.: 12/365,241

(22) Filed: Feb. 4, 2009

(65) Prior Publication Data

US 2009/0141828 A1    Jun. 4, 2009

Related U.S. Application Data

(63) Continuation-in-part of application No. 11/702,523, filed on Feb. 6, 2007.

(60) Provisional application No. 61/025,928, filed on Feb. 4, 2008, provisional application No. 60/765,744, filed on Feb. 7, 2006, provisional application No. 60/811,408, filed on Jun. 7, 2006.

(51) Int. Cl.
   *H04K 1/02* (2006.01)
(52) U.S. Cl. .................. 375/296; 375/297; 375/295; 375/308; 330/151; 330/149
(58) Field of Classification Search ............... 375/296, 375/297, 295, 308; 330/149, 151
See application file for complete search history.

(56) References Cited

U.S. PATENT DOCUMENTS

| 6,054,896 A | * | 4/2000 | Wright et al. | 330/149 |
| 6,141,390 A | * | 10/2000 | Cova | 375/297 |
| 6,885,241 B2 | | 4/2005 | Huang et al. | 330/149 |
| 2003/0095607 A1 | * | 5/2003 | Huang et al. | 375/296 |
| 2005/0180527 A1 | * | 8/2005 | Suzuki et al. | 375/297 |

OTHER PUBLICATIONS

G.Prescott, J.Hammond, and D.Hertling, "Adaptive estimation of transmission distortion in a digital communications channel", *IEEE Trans. on Communications*, vol. 36, No. 9, Sep. 1988.
T.Muller, "Performance degradation in GPS-receivers caused by group delay variations of SAW-filters", *IEEE MTT-S Digest*, Jun. 7-12, 1998.
F.Perez-Martinez, M.Burgos-Garcia and A.Asensio-Lopez, "Group delay effects on the performance of wideband CW-LFM radars", *IEE Proc.-Radar, Sonar Navig.*, vol. 148, No. 2, Apr. 2001.

(Continued)

*Primary Examiner*—Eva Y Puente
(74) *Attorney, Agent, or Firm*—Teitelbaum &MacLean; Neil Teitelbaum; Doug MacLean

(57) ABSTRACT

The invention relates to methods and circuits for compensating linear in-band distortions such as those occurring in RF circuits of broad band communication systems. A low-rate sampling is used to collect statistical information about a modulated signal after it passed through the distorting circuits, which is then compared to reference statistical information for the modulated signal to iteratively adjust a frequency response of an equalizing linear filter inserted into the signal path so as to compensate for the distortions.

22 Claims, 21 Drawing Sheets

OTHER PUBLICATIONS

X.Huang and M.Caron, "A novel adaptive type-based baseband predistorter for solid-state power amplifier", *Proceedings of AIAA ICSSC2002*, Montreal, Canada, May 13-15, 2002.

H.Durney and J.Sala, "CDF estimation for pre-distortion of non-linear high power amplifiers", *Proceedings of ICASSP2002*, May 13-17, 2002.

X. Huang and M. Caron, "Experimental Results of a Type-Based Predistorter for SSPA Linearization", *Proceedings of ISCAS2004*, Vancouver, Canada, May 23-26, 2004.

X. Huang and M. Caron, "Performance of a Type-Based Digital Predistorter for Solid-State Power Amplifier Linearization", *Proceedings of ISCAS2005*, Kobe, Japan, May 23-26, 2005.

D.Huang, X.Huang and H.Leung, "Nonlinear Compensation of High Power Amplifier Distortion for Communication Using a Histogram-based Method", *IEEE Trans. On Signal Processing*, vol. 54, Nov. 2006.

X.Huang and M.Caron, "Benefit of linearizing power amplifiers in multi-port amplifier subsystems", *Proceedings of ISCAS2008*, Seattle, USA, May 18-21, 2008.

X.Huang and M.Caron, "Performance improvement from linearizing power amplifiers in multi-port amplifier subsystems", *Signal Processing for Space Communications*, Rhodes, Greece, Oct. 6-8, 2008.

M.Caron and X.Huang, "Estimation of gain and phase mismatch between amplifiers in a multiple port amplifier subsystem", *ESA Workshop on Advanced Flexible Telecom Payloads*, Noordwijk, Netherlands, Nov. 18-20, 2008.

X.Huang and M.Caron, "A novel type-based vector modulator self-calibration technique", to be presented at *ISCAS2009*, Taipei, Taiwan, May 24-27, 2009.

\* cited by examiner

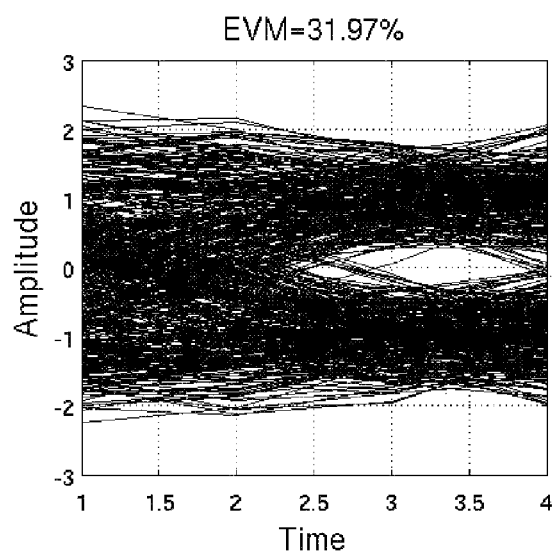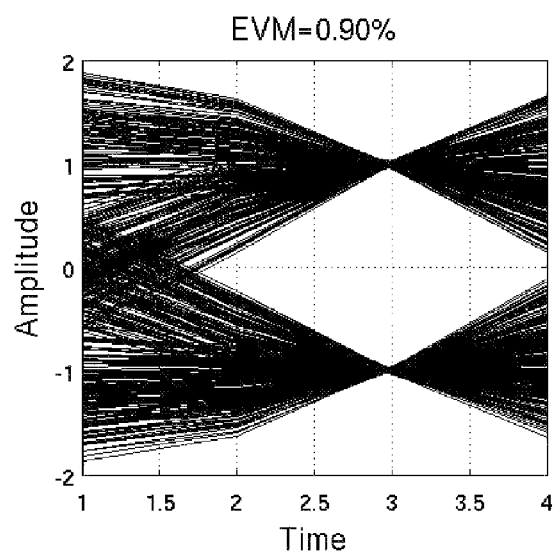
FIG. 20A                                              FIG. 20B

DISTORTION COMPENSATION CIRCUIT AND METHOD

CROSS-REFERENCE TO RELATED APPLICATIONS

The present invention claims priority from U.S. Provisional Patent Application No. 61/025,928, filed Feb. 4, 2008, entitled "Type-based estimation of frequency response equalizer's coefficients", which is incorporated herein by reference. It is a continuation in part of U.S. patent application Ser. No. 11/702,523, filed Feb. 6, 2007, entitled "Self-calibrating multi-port circuit and method", which claims priority from U.S. Provisional Patent Application No. 60/765,744, filed Feb. 7, 2006, entitled "Type-based direct transmitter self-calibration technique", and U.S. Provisional Patent Application No. 60/811,408, filed Jun. 7, 2006, entitled "Type-based subsystem calibration technique", which are incorporated herein by reference for all purposes.

TECHNICAL FIELD

The present invention relates generally to systems and methods for transmission of wireless signals in the presence of distortion, and in particular to distortion compensation circuits and methods for compensating in-band distortions of a communication signal.

BACKGROUND OF THE INVENTION

In many communication systems, such as those employing wideband signals like spread spectrum or very high data rate links, as well as those with stringent constraints in out-of-band spurious levels, the overall channel frequency response results in non-flat in-band amplitude and group delay responses. Such distortions in the frequency response degrade the link performance leading to a requirement for an increased transmit power and/or higher transmit bandwidth.

For example, in a typical wireless transmitter of a wireless communication system, an input signal is provided to a transmitter for transmission therefrom. Typically prior to transmitting the signal, the transmitter conditions the signal so that it is in a form suitable for transmission. Such conditioning typically involves pulse shaping, one or more stages of frequency up-conversion each followed by filtering and amplification before being fed to an antenna, wherein a high-frequency communication signal goes through a number of devices and components, which frequency amplitude and group delay responses may not be flat, resulting in the signal distortion degrading the system performance.

Referring to FIG. 1, a prior art quadrature direct transmitter 10 is shown by way of illustration. The transmitter 10 includes an input port 101, which in operation is fed by an input bit stream of information bits. This input bit stream is received by a mapping circuit 105, that is used to generate an in-phase (I) signal at a first output port and a quadrature (Q) signal at a second output port thereof. Pulse shaping circuit 110 is connected to the output ports of the I/Q mapper, respectively, for receiving the I and Q signals and for pulse shaping thereof. The I and Q pulse shaped signals are converted from a digital domain to an analog domain using digital to analog (DA) converters (DACs) 120. After conversion a vector modulator circuit 125 receives the DA converted signals. Within the vector modulator 125, the analogue I and Q signals independently modulate in-phase and quadrature components of a carrier signal generated by a local oscillator (LO) 128 to produce an up-converted modulated signal, also referred to as the RF signal. Thereafter the RF signal is provided to the RF circuit 130, which may include one or more stages of frequency conversion, filtering and amplification circuits and a power amplifier circuit, and then is fed to an antenna.

The RF circuit 130 may introduce various distortions in the RF signal that degrade the communication system performance. One cause of such distortions is the non-linearity of an amplification characteristic of the power amplifier (PA) that may be included in the RF circuit 130, which introduces non-linear distortions in the amplified signal. These non-linear distortions divert some of the energy from a desired frequency channel into adjacent frequency channels, thereby resulting in a loss of performance within a desired frequency channel as well as the creation of interference within adjacent frequency channels.

U.S. Pat. No. 6,885,241, issued to the inventors of the current invention and assigned to the assignee of the current application, discloses a method and circuit for compensating for these non-linear conversion distortions. According to this method, the amplified signal is sampled at a sampling rate that can advantageously be lower than the data rate of the signal, and statistical information about an envelope function of the amplified signal is collected in the form of a cumulative distribution function (CDF) of the amplified signal's modulation envelope. The method taught in the '241 patent is based on an observation that, when a signal is nonlinearly distorted, the signal envelope CDF is distorted as well. By comparing a reference CDF of the non-distorted signal and the actual CDF at the output of the PA, a pre-distortion function can be derived, which, when applied to the input signal prior to the PA, results in the CDF of the amplified signal that substantially approximates the reference CDF. It was also found that the application of this pre-distortion function to the input signal results in an opening of an eye diagram and a substantial reduction in the bit error rate (BER) of the transmitted signal at the receiver.

Although the method described in the '241 patent has many attractive features and works well in reducing the detrimental effect of the PA non-linearity when such nonlinearities are constant over frequency, it is not directly applicable to linear in-band distortions in the RF circuit 130 where the level of distortion is frequency dependent, such as non-uniform group delay and/or amplitude frequency response of the RF circuit. One reason for this is that the CDF represents a distribution of the signal intensity that is frequency independent, and therefore signal transformations that directly affect the intensity of the modulated signal can be straightforwardly deduced from the CDF's shape. Contrary to that, the linear in-band distortions, rather than change the intensity of the signal, distort its spectrum, and therefore there appears to be no direct and clear way of deducing such distortions from the shape of the CDF. Furthermore, a frequency dependency that is introduced by the in-band group delay and amplitude distortions signify the presence of a memory effect in the circuit, so that the response of the circuit at any given instant of time is dependent of its past. This circuit memory makes impossible the direct mapping of changes in the CDF shape to distortions in the circuit.

Unfortunately, these linear in-band distortions of the transmitted signal become a significant source of errors, especially for broad-band transmission systems operating at high carrier frequencies, e.g. in the wavelength range of a few centimeters or less.

There is a number of prior art methods of compensating for the in-band distortions, such as attempting to design the transmit chain in such a way that it has a frequency response that is flat in amplitude and group delay over the frequency band of interest. However, this approach requires selecting components with tight tolerances, which may be significantly more expensive or may not be available for circuits operating at very high frequencies, such as in the GHz range and above. Often a calibration is required to provide a lookup table that can be then used in operation to control circuit elements over temperature. However, in addition to requiring more complex calibration procedures, such look-up tables are inevitably approximate and their use typically results in insufficient compensation of in-band distortion for some applications.

An object of the present invention is to provide an adaptive distortion compensation circuit and a related method for compensating linear in-band distortions that appear in a transmission path of a communication system.

SUMMARY OF THE INVENTION

In accordance with the invention, there is provided a distortion compensation circuit for compensating in-band distortion experienced by a modulated signal in a communication path. The circuit comprises an input port for providing the modulated signal, a linear filter for adaptively modifying a spectrum of the modulated signal, the linear filter having a control port for receiving a set of filter coefficients defining a frequency response of the linear filter, an output port for providing an output signal comprising at least a portion of the modulated signal after the propagation thereof through the communication path and the linear filter, a reference circuit for providing a reference envelope statistical function (ESF) for the modulated signal prior to the propagation thereof through the communication path, and a filter control circuit coupled between the output port and the control port of the linear filter for adjusting the frequency response thereof in dependence upon the output signal. The filter control circuit comprises: a sampling circuit for sampling at least a portion of the output signal to provide a plurality of signal envelope samples, an ESF estimator for estimating an output ESF based on the plurality of signal samples, a filter generator for generating the filter coefficients based on the reference ESF and the output ESF, and for providing said filter coefficients to the control port of the linear filter for adjusting the frequency response thereof so as to reduce a difference between the reference ESF and the output ESF.

In accordance with one aspect of this invention, the filter control circuit comprises an objective function generator (OFG) coupled to the ESF estimator and the reference circuit for generating an objective function based on the reference ESF and the output ESF, and a memory for storing the objective function coupled to the OFG, and the filter generator is coupled to said memory and to the OFG for generating adjusted filter coefficients based on stored and current objective function values.

In accordance with one aspect of this invention, there is further provided a method for compensating in-band distortion experienced by a modulated signal in a communication path, which comprises: a) providing a reference envelope statistical function (ESF) for the modulated signal; b) providing a linear filter having a frequency response defined by a set of filter coefficients; c) passing the modulated signal through the linear filter and the communication path to obtain an output signal; d) estimating an output ESF for the output signal; and, e) adjusting one or more of the filter coefficients of the linear filter so as to decrease a difference between the reference ESF and the output ESF.

According to one feature of the present invention, step (e) further comprises: e1) determining an objective function value based on the reference ESF and the output ESF, and saving said value in memory; e2) varying one or more of the filter coefficients to adjust the frequency response of the linear filer; e3) repeating (c) and (d) to obtain an updated output ESF; e4) determining a new objective function value based on the reference ESF and the updated output ESF; and, e5) updating one or more of the filter coefficients of the linear filter in dependence upon a difference between the new and saved values of the objective function.

In accordance with one aspect of this invention, there is further provided a method for compensating in-band distortion experienced by a modulated signal in a communication path, which comprises: a) providing a reference envelope statistical function (ESF) for the modulated signal; b) providing a linear filter having a frequency response defined by a set of adjustable filter coefficients; c) providing a first set of filter coefficients to the linear filter; d) passing the modulated signal through the linear filter and the communication path to obtain an output signal; e) estimating an output ESF for the output signal; f) obtaining a first objective function value based on the output ESF and the reference ESF, and saving said objective function value in memory; c) providing a second set of filter coefficients to the linear filter, and repeating steps (d)-(f) to obtain a second objective function value; d) generating a third set of filter coefficients based on the first and second objective function values so as to reduce a difference between the reference ESF and the output ESF.

BRIEF DESCRIPTION OF THE DRAWINGS

The invention will be described in greater detail with reference to the accompanying drawings which represent preferred embodiments thereof, wherein:

FIGS. 20A and 20B are graphs illustrating the eye diagrams for the transmitted RF signal before (20A) and after (20B) the iterative distortion compensation using the adaptive linear equalization filter according to the present invention;

DETAILED DESCRIPTION

Figure 1:
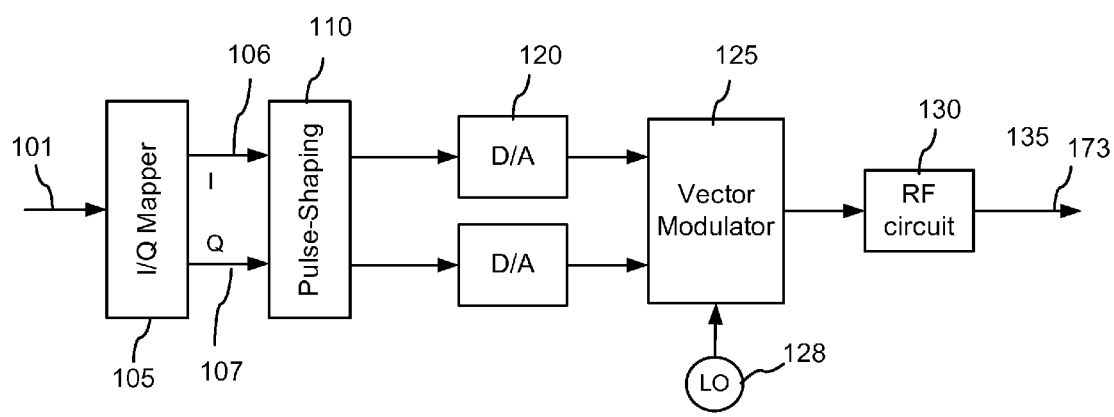
FIG. 1 is a diagram of a prior-art quadrature transmitter for transmitting a modulated RF signal.

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description that follows hereinbelow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Furthermore, the term "circuit" in the context of the present specification means either a single component or a multiplicity of components, either active or passive, that are arranged to cooperate with one another to provide a desired function, and may be at least partially implemented in firmware and/or software.

The term "signal" is used herein to mean at least one of: an RF signal, a current signal, a voltage signal or a data signal.

The term "RF signal" is used herein to mean an electrical, including electromagnetic, signal having a central frequency between about 1 MHz and about 1 THz.

The term "RF circuit" means an electrical circuit for propagating and/or modifying RF signals.

The term "modulated signal" as used herein includes modulated AC carrier signals having non-zero carrier frequency and having its frequency, phase and/or amplitude modulated according to a pre-determined modulation format with a sequence of information symbols, and modulating signals having a DC carrier, such as binary or multi-level data signals, used to modulate one of the parameters of an AC carrier signal. The terms "modulation format" and "modulation scheme" are used in the specification interchangeably.

Preferred embodiments of the invention will be described hereinbelow mainly in application to quadrature transmitters and receivers, although it can be used for other types of circuits or sub-systems for generating and transmitting signals wherein some part of the system has a non-flat group delay and/or amplitude frequency response that introduces linear in-band distortions in the transmitted signal.

Figure 2:
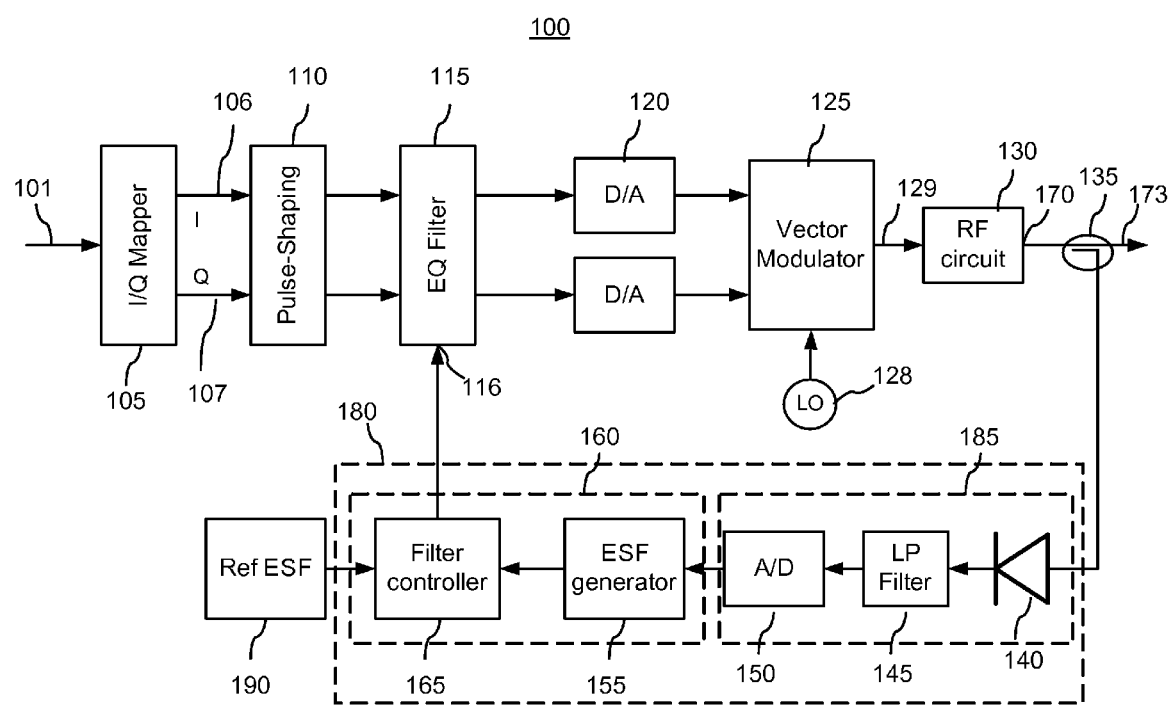
FIG. 2 is a diagram of a transmitter incorporating an equalizing linear filter and a filter control circuit according to one embodiment of the present invention.

Referring first to FIG. 2, a functional block diagram of a quadrature transmitter (QT) 100 according to the first embodiment of the invention is shown. This transmitter will now be described along with an embodiment of the method of the present invention for compensating in-band distortions. The transmitter 100 includes many of the same or similar elements as the prior art transmitter 10 shown in FIG. 1; these same or similar elements in FIGS. 1 and 2, and further in FIGS. 15-18 are labeled with same reference numerals, and may be described in this specification only once as required for understanding of the present invention.

Similarly to the QT 10, the input port 101 of the QT 100 connects to the I/Q mapper 105, which together with the pulse-shaping circuit 110 forms a baseband modulator. Two transmit chains, an I-signal chain and a Q-signal chain include the DACs 120 and optional anti-aliasing low-pass filters (LPF) that are not shown in the figure. These LPFs in each chain may be followed by amplifiers which are not shown in this figure. The I and Q signal chains receive digital I and Q signals, which are mutually orthogonal to each other, convert them into analogue I and Q signals using the DACs 120, optionally filter them, and feed said signals to the vector modulator (VM) 125, which in the shown embodiment has the local oscillator (LO) 128 connected thereto. The VM 125 may include two mixers, a phase shifter and a signal combiner, for example as described in U.S. Patent Publication 2008/0143562, which is incorporated herein by reference.

A signal generated by the local oscillator 128 is split in the VM 125 into two orthogonal signals in the VM 125 having a 90° phase-shift therebetween. These orthogonal LO signals are multiplied by the in-phase signal I and the quadrature signal Q, respectively, and then summed to form an RF signal at the output of the VM 125. This RF signal is then passed through the analog RF circuit 130 and output therefrom as an output RF signal 173, which will be denoted herein s(t). The RF circuit 130 may include one or more frequency up-conversion stages, one or more amplifiers and/or filters for amplifying and preparing the RF signal for transmitting thereof via a communication, typically wireless, channel to a remote receiver.

Besides performing its designated function, the RF circuit 130 also introduces in-band distortions in the RF signal 173, since it is usually very difficult or impossible to achieve flat amplitude and group delay characteristics in the passband of an RF circuit, especially for wideband communication signals and for carrier frequencies in the millimeter and sub-millimeter wave range. Any in-band distortions in the amplitude and phase responses of the RF circuit 130 will inevitably distort its output signal, thereby degrading the overall performance of the transmission system. To compensate for these distortions, a linear equalization (EQ) filter 115 having a control port 116 is provided in the path of the modulation signal for adaptively modifying the signal's spectrum in response to a control signal provided to the control port 116. In the shown embodiment, this linear EQ filter 115, which is also referred to herein as the linear filter or the EQ filter, is coupled in the signal path between the base-band modulator formed by the blocks 105, 110 and the DA converters 120, but in other embodiments can be coupled elsewhere in the path of the modulation signal. The control signal that the EQ filter 115 receives in operation carries information related to a set of filter coefficients that define the filter's frequency response, as described hereinbelow in this specification with reference to specific exemplary embodiments. In operation, the frequency response of the EQ filter 115 is iteratively adjusted to substantially compensate for in-band linear amplitude and/or phase distortions in the RF circuit 130 based on matching a statistical characteristic of the RF signal at the output of the RF circuit 130 to a reference statistical characteristic related to a corresponding "ideal" modulated signal without the in-band distortions.

In many cases, amplitude and group delay responses of the RF circuit 130 within its passband have two major components: a linear component and a quadratic component. In some cases, the in-band amplitude response has ripples, which may be modeled by an additive sinusoidal term. The additive ripple usually has little impact on the system performance and therefore will not be described here, although it will be appreciated that the ripple distortion could be easily accounted for within the method of the current invention.

The quadratic and linear components of the amplitude response of the RF circuit 130 can be modeled as $$\text{Quadratic:} \quad a_q(f) = \alpha_1 \left( \frac{f - f_o}{B} \right)^2 \tag{1}$$

$$\text{Linear:} \quad a_l(f) = \alpha_2 \left( \frac{f - f_o}{B} \right) + 1 \tag{2}$$

where $\alpha_i$, $i=1, 2$, are respective coefficients, f is the frequency, $f_o$ is a centre frequency within the RF circuit passband, and B is a characteristic bandwidth, and may be taken for example as the width of the RF circuit passband. The constant "1" in the linear component, equation (2), is introduced so that the amplitude response has a value of "1" at the centre frequency $f_o$.

It is convenient to define a normalized frequency according to the following equation (3):

$$f \equiv \frac{f - f_o}{B} \tag{3}$$

In the following, unless stated otherwise, "f" will denote the normalized frequency, with the circuit passband centered at f=0 and spreading from −0.5 to 0.5, i.e. defined by −0.5<f<0.5. With this definition, the total amplitude response a(f) of the RF circuit 130 can be expressed as $$a(f) = a_q(f) + a_l(f) = \alpha_1 f^2 + \alpha_2 f + 1 \tag{4}$$

Similarly, the phase response $\phi(f)$ of the RF circuit 130, derived from the group delay consisting of quadratic and linear components, can be modeled as $$\phi(f) = -(\beta_1 f^3 + \beta_2 f^2 + f) \tag{5}$$

where $\beta_i$, $i=1, 2$, denotes coefficients of the phase response. Given the amplitude response of Equation 4 and the phase response of Equation 5, the full in-band transmission characteristic $H(f|\alpha_1, \alpha_2, \beta_1, \beta_2)$ of the RF circuit 130 in the frequency domain, also referred to herein as the frequency response of the RF circuit, can be expressed as $$H(f|\alpha_1,\alpha_2,\beta_1,\beta_2) = (\alpha_1 f^2 + \alpha_2 f + 1) \cdot \exp\{-j2\pi \cdot (\beta_1 f^3 + \beta_2 f^2 + f)\} \tag{6}$$

Figure 3:
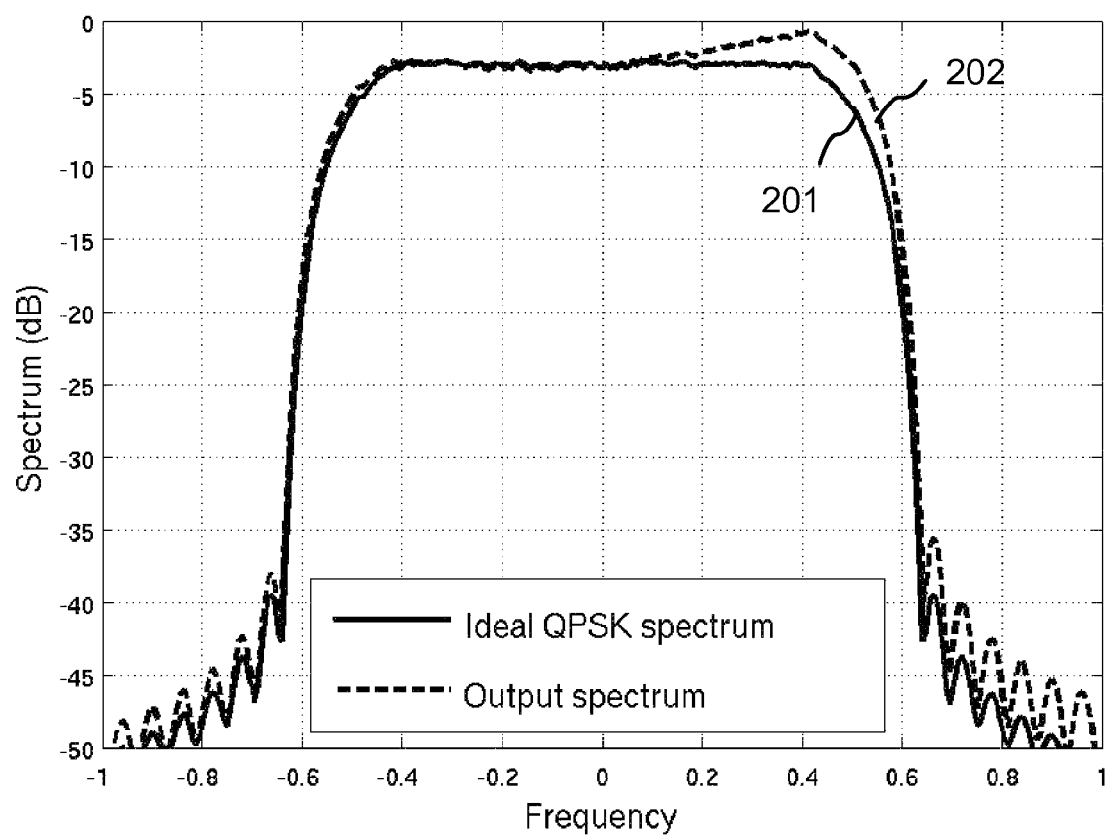
FIG. 3 is a graph illustrating the effect of exemplary in-band phase and amplitude distortion on a spectrum of the transmitted RF signal.
Figure 4:
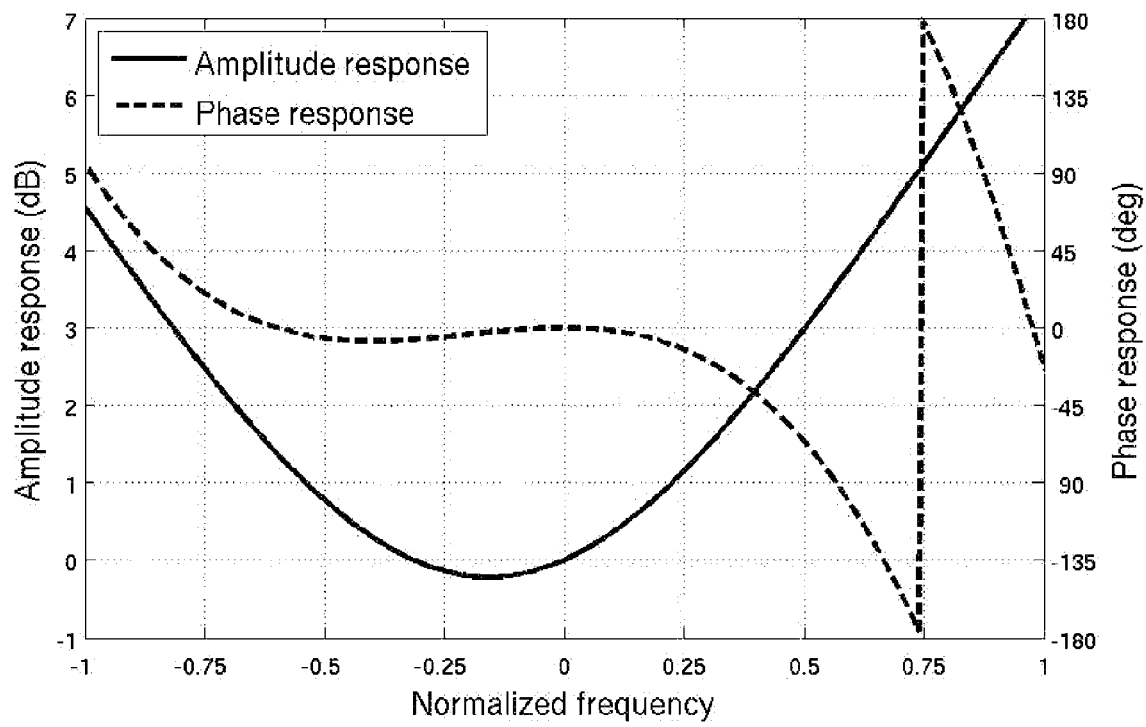
FIG. 4 is a graph illustrating the exemplary in-band phase and amplitude distortion spectra used in obtaining results of FIG. 3.

By way of example, FIG. 3 shows a power spectrum 202 of the RF signal at the output of the RF circuit 3 in the absence of the EQ filter 115, or, equivalently, if the transmission characteristic thereof is flat within the passband of the circuit. The power spectrum 202 was obtained for a QPSK modulated signal, with a square-root raised-cosine pulse shaping function having a roll-off factor equal to 0.25 as defined by the pulse shaping filter 110, with the following values of the amplitude and phase distortion coefficients: $\alpha_1 = 1.0068$, $\alpha_2 = 0.3162$, $\beta_1 = 4.1821$, and $\beta_2 = 2.5158$. The corresponding profiles of the amplitude and phase responses of the circuit are illustrated in FIG. 4. For comparison, an "ideal" power spectrum 201 is also shown, wherein the ideal power spectrum is the power spectrum of the QPSK modulated signal that would have been output by the RF circuit 130 having a flat amplitude and group delay response $H_{ideal}(f)$ that is independent of the frequency f within the circuit's passband. FIG. 3, where the spectra 201 and 202 are plotted versus the normalized frequency f, clearly shows distortions in the power spectrum 202 that stem from the amplitude response of the circuit 130, which are most evident at the high-frequency side of the spectrum. The phase distortion is not visible in the spectrum 202, since the power spectrum only contains the amplitude information.

Figure 5:
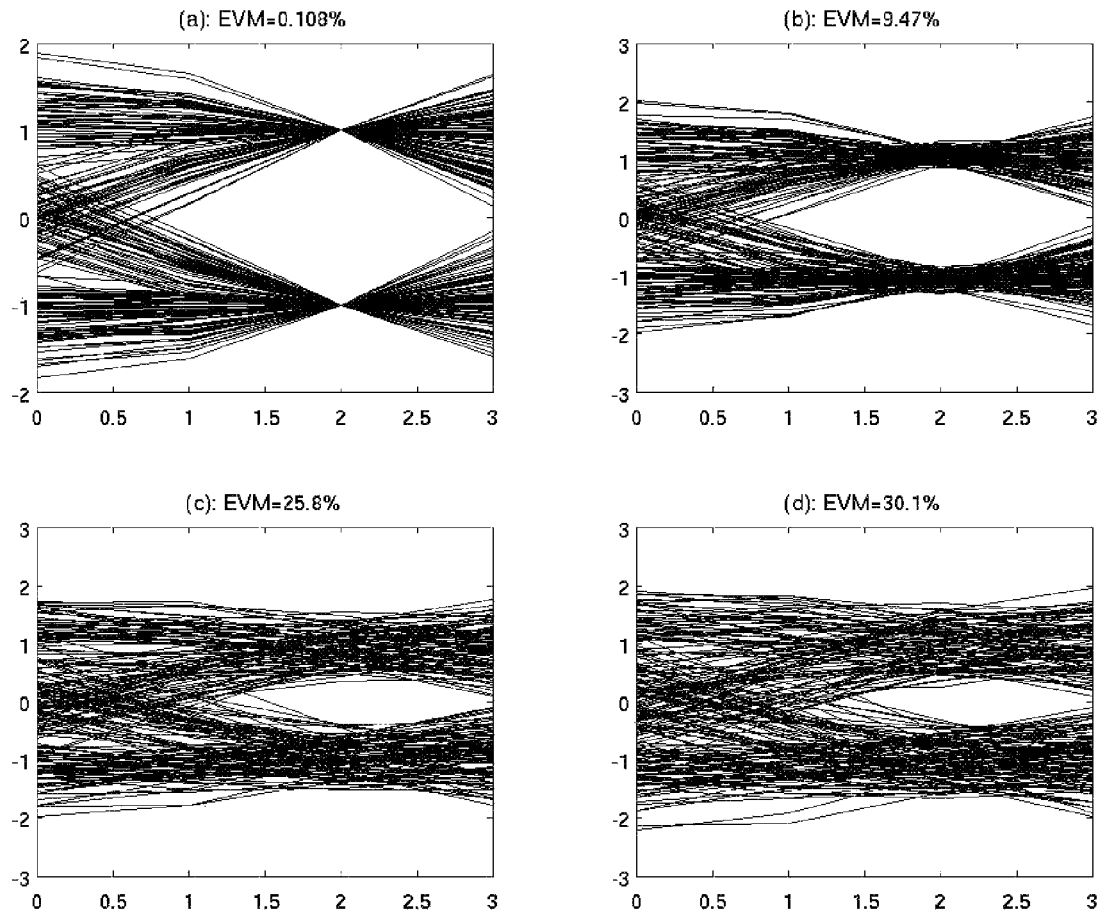
FIG. 5 is a graph illustrating eye diagrams in the absence of a) in the absence of distortions, b) with the amplitude distortion shown in FIG. 4 without the equalizing filter, c) with the phase distortion shown in FIG. 4 without the equalizing filter, and d) with the amplitude and phase distortions shown in FIG. 4 without the equalizing filter.

Detrimental effects of the exemplary in-band distortions for the performance of the transmission system are further illustrated in FIG. 5, which shows four eye diagrams: (a) an ideal eye diagram which would have been obtained by detecting the output RF signal of the QT 100 in the absence of the amplitude and group delay distortions; (b) an eye diagram for an RF signal at the output of the RF circuit 130 with the in-band amplitude distortion only; (c) an eye diagram for an RF signal at the output of the RF circuit 130 with the in-band phase distortion only; and (d) an eye diagram for the RF signal at the output of the RF circuit 130 with both the in-band amplitude and phase distortions. The corresponding values of an error vector magnitude (EVM), as commonly defined, are displayed on top of each plot, showing an increase in the EVM value from about 0.1% for the ideal signal in the absence of the in-band distortions, to about 31.4% when the exemplary group delay and amplitude distortions of the RF signal are accounted for.

By suitably adjusting in-band frequency transmission characteristics of the EQ filter 115, the effect of the in-band distortions in the RF circuit 130 can be substantially, or at least partially, compensated. To cancel out the effects of the RF circuit in-band distortion the frequency response $C(f|a_m, b_n)$ of the EQ filter 115 must meet the following requirement:

$$C(f|a_m, b_n) = \frac{1}{H(f|\alpha_1, \alpha_2, \beta_1, \beta_2)}, \quad (7)$$

where $a_m$, m=1, ..., $M_f$ and $b_n$, n=1, ..., $N_f$ are parameters defining the amplitude and phase responses, respectively, of the EQ filter 115, which will be referred to hereinafter as the amplitude and phase filter coefficients, respectively. By way of example, if the frequency response of the RF circuit 130 is defined by equations (4) and (5), the frequency response of the EQ filter 115 should satisfy the following equation (8):

$$C(f|a_m, b_n) = \frac{\exp\{j2\pi(\beta_1 f^3 + \beta_2 f^2 + f)\}}{(\alpha_1 f^2 + \alpha_2 f + 1)} \quad (8)$$

Generally, a variety of filter models may be used to define the transmission characteristics of the EQ filter, with one example being a polynomial representation of the amplitude and phase characteristics according to the following equation (9):

$$C(f|a_m, b_m) = \left(\sum_{m=0}^{M_f-1} a_m f^{M_f-m} + 1\right) \exp\left(\sum_{n=0}^{N_f-1} b_m f^{N_f-n}\right) \quad (9)$$

Suitable values for the integers $M_f$ and $N_f$, which define the number of adjustable filter coefficients used in the particular filter model of equation (9), will depend on a particular application and maybe selected as a trade-off between the desired compensation accuracy, algorithm complexity and convergence time. It will be appreciated that other filter models can also be used, for example based on rational functions, with the right hand side (RHS) of equation (8) representing one example thereof. Although the description of particular exemplary embodiments will refer to the phase and amplitude filter coefficients $a_m$ and $b_n$, it will be appreciated that other sets of filter coefficients, for example related to filter models other than that defined by equation (9), may also be used within the scope of the current invention.

The distortion parameters $\alpha_i$, $\beta_i$ of the RF circuitry of the transmitter 100 are generally not known to the user and can vary from circuit to circuit, and for a same circuit with time and with changing environmental conditions, such as temperature. The present invention provides means to determine and adaptively adjust in-band frequency transmission characteristics of the EQ filter 115 so as to substantially compensate for the amplitude and/or phase distortions in the RF circuits of the transmitter, and generally in the communication path of the modulation signal from a baseband modulator at the transmitter to a baseband demodulator at a corresponding receiver.

For this purpose, the transmitter 100 employs a filter control circuit 180 connected between the output port 170 of the RF circuit 130 and the control port 116 of the EQ filter 115.

According to the invention, in operation the filter control circuit 180 iteratively adjusts the filter coefficients that define the frequency response of the EQ filter 115, such as $a_m$ and $b_n$, so as to compensate for the in-band distortions in the communication path of the modulation signal. To this end, the filter control circuit 180 monitors a statistical property or characteristic of the output signal s(t) 173, compares it to a reference characteristic of an "ideal", non-distorted output signal $s_0(t)$, and derives based on this comparison distortion compensation information required to suitably modify the frequency response of the EQ filter 115 in such a way that in-band distortions in the RF circuit 130 are substantially compensated. The filter control circuit 180 thus cooperates with the EQ filter 115 to adaptively adjust the frequency response of the EQ filter 115 according to the current conditions of the RF circuit 130. Accordingly, the EQ filter 115 is able to react to variations in the RF circuit's parameters due to variations in ambient temperature and the like occurring during circuit operation.

In the embodiment illustrated in FIG. 2, the filter control circuit 180 includes a sampling circuit 185, an envelope statistical function (ESF) generator 155, also referred to herein as the ESF estimator, and a filter controller (FC) 165. The ESF generator 155 and the FC 165 may be in the form of functional modules programmed within a processor 160, which may be embodied for example as a digital signal processor (DSP), an FPGA, a specialized microprocessor, a general purpose processor, or a combination of the above, or can be a part of an ASIC that may also perform other functions such as those of blocks 105, 110 and/or 115.

The sampling circuit 185 is formed by an envelope detector 140, which may be embodied as an RF power detector and is coupled to the output port 170 with a coupler 135 to receive at least a fraction of the output RF signal s(t). The envelope detector 140 is followed by an anti-aliasing low-pass filter (LPF) 145, which is in turn followed by an analog-to-digital (A/D) converter (ADC) 150. Output of the ADC 150 in the form of a stream of signal samples p(l) is fed to the ESF generator 155. Optionally, an amplifier (not shown) may be present in the filter control circuit 180 prior to the processor 160. A reference circuit 190 in the form of a computer readable memory that is coupled to the FC 165 is provided for storing reference ESF information as will be explained hereinafter. In some embodiments, the memory 190 can be a part of the processor 160. In another embodiment, the EQ filter 115 and the processor 160 may be embodied using a single integrated circuit. Advantageously, the sampling rate implemented by the ADC 150 may be substantially smaller than the data rate R of the modulated signal or the modulations bandwidth of the RF signal 173, so that the filter control circuit does not require high-speed data or signal processing or complex hardware.

The term "envelope function", or simply "envelope" in the context of this specification relates to a modulated carrier signal, and is used herein to mean a signal, or a function thereof, that can be obtained by time-averaging of said modulation signal power over a sliding time window that substantially exceeds the period $2\pi/\omega$ of the LO carrier, but is on the order of or less than a period $T_m$ associated with the modulation. In the embodiment described herein, an envelope of the modulation signal s(t) is obtained using the power, i.e. square, detector 140 having a response time $\tau$ satisfying a relationship $2\pi/<<\tau<\sim T_m$, where $T_m$ is the modulation period of the I and Q signals and the RF output signal s(t). Note that in other embodiments, the envelope function of the output signal s(t) can be obtained using an alternative envelope detector 140, e.g. a linear or a logarithmic envelope detector, so that the shape of the envelope function S(t) can differ in alternative embodiments.

Operation of the filter control circuit 180 maybe understood by noting that a modulated signal carrying a sufficiently long information sequence has many properties of a random signal when viewed over a time scale much longer than the length of an individual information symbol, and that statistical properties of an envelope function of a modulation signal substantially depend on the respective modulation format used to produce the modulated signal, and are sensitive to signal distortions. Given a selected modulation scheme and a pulse shaping function, which for the transmitter 100 is defined by the I/Q mapper 105 and the pulse-shaping filter 110, the "ideal" modulated signal $s_0(t)$ has a unique envelope statistical characteristic. The approach of the present invention is to adjust the filter coefficients of the EQ filter 115 based on the statistical properties of the output signal envelope.

In an ideal case with no distortions, the envelope function $S_0(t)$ of the output signal $s_0(t)$, as detected by the power detector 140, satisfies the following relationship (10):

$$S_0(t) \sim I^2 + Q^2 = P_{ideal}(t), \quad (10)$$

where $P_{ideal}(t)$ is the instantaneous power of the ideal, non-distorted output signal $s_0(t)$. In this ideal case, the sampling circuit 185 would provide to the ESF generator 155 a sequence of signal samples $p_{ideal}(l) = P_{ideal}(t_l)$, wherein $t_l$, $l=1, 2, \ldots$ denotes consecutive time instances at which the ADC 150 samples the power signal P(t) as received from the LPF 145.

When the uncompensated distortions in the RF circuitry of the transmitter 100 are taken into account, the power detector 140 provides to the LPF 145 a signal proportional to the envelope function S(t) of the actual output signal s(t), $$S(t) \approx V^2 + U^2 = P_{actual}(t), \quad (11)$$

where $P_{actual}(t)$ is the power of the actual output signal s(t) as detected by the detector 140. This envelope signal is filtered by the LPF 145 and sampled by the ADC 150, and a sequence of actual signal samples $p_{actual}(n) = P_{actual}(t_n)$, $n=1, 2, \ldots$, is provided to the ESF generator 155. The ESF generator 155 accumulates a plurality of these signal samples and processes them to determine an output ESF, also referred to herein as the output distribution information or the output type information, for the actual output RF signal 173.

In the context of the present invention, the term "envelope statistical function", or ESF, of a modulated signal x refers to a statistical function of the modulated signal envelope obtained by sampling the modulated signal envelope at a specified time interval. Examples of the ESF include but not limited to: a cumulative distribution function (CDF), a probability density function (PDF), a statistical cumulant or a function thereof, and a statistical moment or a function thereof.

In one embodiment, the ESF generator 155 has a buffer for collecting a suitably large number of the signal samples $p_{actual}(n)$ so as to obtain a plurality of signal samples $\{p_{actual}(n), n=1, \ldots, L_s\} = \{p_{actual}\}$, where $L_s$ is a suitably large number, for example 10,000 or greater, and then sorts said plurality of signal samples in logical bins according to their magnitude, to obtain a histogram representing the PDF of the output signal s(t). The PDF of the actual output signal obtained in this way will be denoted hereinbelow as $PDF_{actual}$.

In one embodiment the PDF of the actual output signal $PDF_{actual}$ may directly be used as the output ESF to assess the presence of distortions in the output signal s(t) by comparing it to a reference PDF of an "ideal" modulated signal, denoted as $PDF_{ideal}$, as described hereinbelow. In another embodiment the ESF generator 155 computes the CDF for the plurality of the output signal samples $\{p_{actual}\}$. This may be done by first computing the $PDF_{actual}$, and then integrating it according to equation (12):

$$CDF_{actual}(k) = \sum_{j=1}^{k} PDF_{actual}(j), \quad k = 1, 2, \ldots, K, . \quad (12)$$

where K is the number of bins in the PDF histogram.

Statistical characteristics of the output RF signal 173 depend on a given modulation scheme and pulse shaping function, and generally vary with the selected modulation scheme. In-band group delay and amplitude distortions added to the modulation signal by the RF circuitry distort statistical characteristics of the output RF signal 173 of the transmitter 100. This is illustrated by way of example in FIG. 6, which shows simulated CDF 212 for the distorted QPSK signal as described hereinabove with reference to FIGS. 3 and 4, in comparison with a CDF 211 obtained for the ideal QPSK modulated signal. The distortion of the CDF due to the linear in-band distortions in the RF circuit 130 is clearly seen in this figure.

In the following an ESF corresponding to a plurality of signal samples $p_{ideal}(l)$ of the ideal, distortion-less modulated signal $s_0(t)$ will be referred to as a reference ESF, which may be in the form of a reference PDF, a reference CDF, or other reference statistical function or characteristic. An ESF that is obtained by sampling the actual output signal s(t) detected at the output of the RF circuit's 130 with an envelope detector 140 will be referred to as an output ESF, which may be in the form of an output PDF, an output CDF, or other statistical function or characteristic of the output signal s(t).

According to one embodiment of the invention, the reference ESF, for example in the form of the reference $CDF_{ideal}(k)$, is stored in memory 190 and in operation is provided to the FC 165, which also receives a corresponding output ESF, in this example in the form of $CDF_{actual}(k)$, from the ESF generator 155. The reference $CDF_{ideal}(k)$ can be unambiguously generated in advance for any selected modulation format and any selected pulse-shaping function implemented by blocks 105 and 110. In one embodiment, the memory 190 stores a plurality of reference ESFs for a plurality of modulation format/pulse shaping function combinations, which are then selected in operation according to an actual modulation and pulse shaping format used in obtaining the I and Q signals received by the VM 125.

Figure 6:
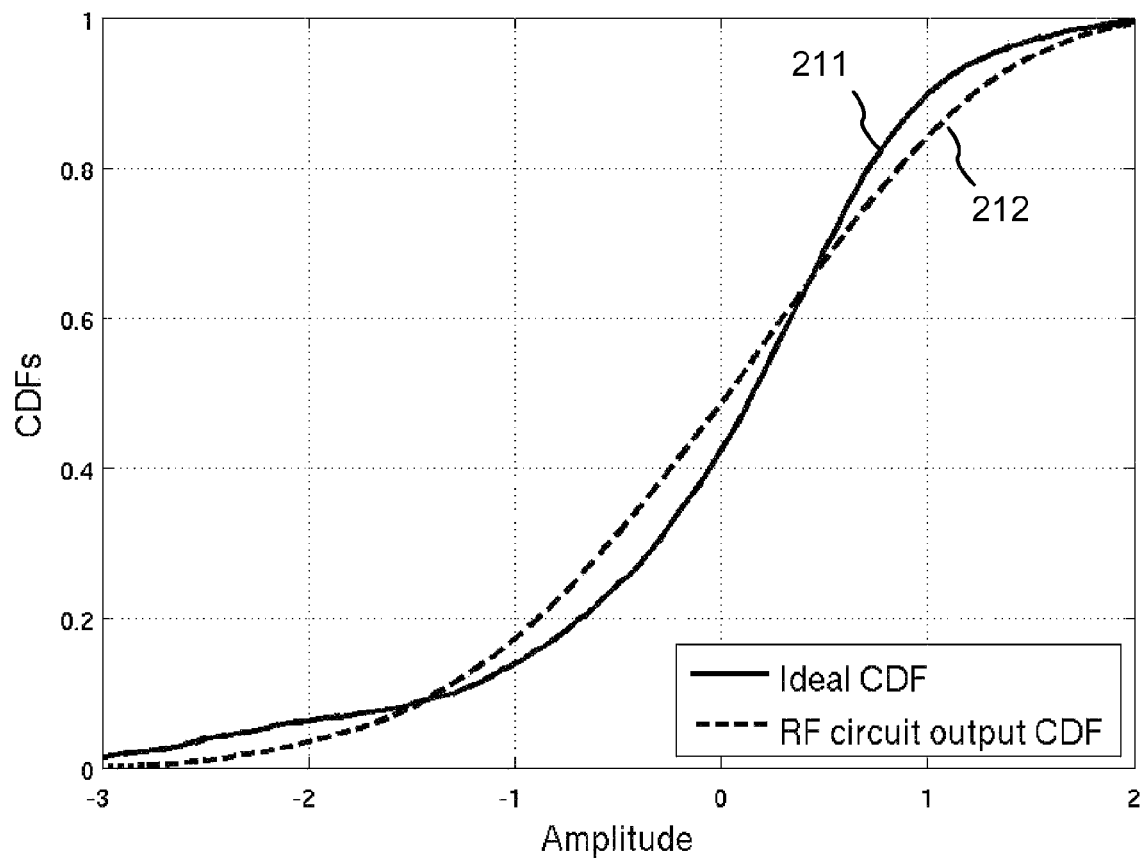
FIG. 6 is a graph illustrating the effect of circuit distortion on the envelope cumulative distribution function for a QPSK signal.

Since in-band distortions in the RF circuitry of the transmitter 100 result in a deviation of the actual output ESF from the reference one as illustrated in FIG. 6, a measure of such deviation can be used as a feedback for determining the filter coefficients that would provide a substantial compensation of the in-band distortions in the RF circuit 130 when uploaded to the EQ filter 115.

In particular, desired filter coefficients values may be obtained in operation by an iterative process that adjusts the frequency response of the EQ filter 115, for example by repeatedly adjusting one or more of the filter coefficients, and searches for values of the filter coefficients that minimize, or at least reduce, a difference between the reference and output ESF.

Figure 7:
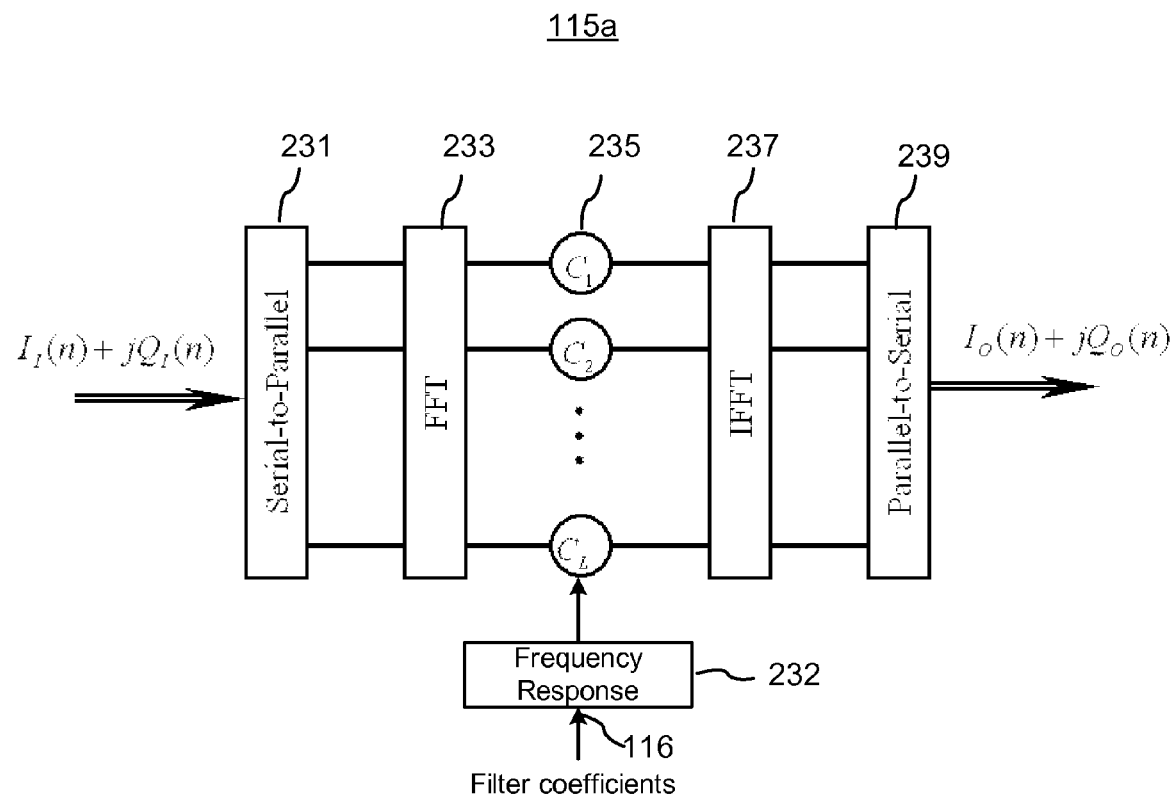
FIG. 7 is a block diagram of a frequency-domain equalizing filter.

The EQ filter 115 may be embodied as a frequency domain filter or a time domain filter. Referring to FIG. 7, in one embodiment the EQ filter 115 is a frequency domain filter 115a that includes a serial to parallel (S/P) converter 231, followed by an FFT (Fast Fourier Transform) module 237, followed by a parallel array of multipliers 235, an IFFT (Inverse Fast Fourier Transform) module 233, and a parallel to serial (P/C) converter 239. In operation, the S/P converter 231 receives two sequences of input digital signals $I_I(n)$ and $Q_I(n)$, and converts them into L>1 parallel streams of complex symbols $S_I(n+l)=I_I(n+l)+jQ_I(n+l)$, where $j^2=-1$ and $l=1, 2, \ldots L$, which are then converted into the frequency domain by the FFT module 233, and multiplied by respective frequency response values $C_l$, $l=1, 2, \ldots L$. The IFFT module 237 and the P/S converter 239 convert the resulting parallel signal into the output digital I and Q signals $I_O(n)$, and $Q_O(n)$. The frequency response values $C_l$, $l=1, 2, \ldots L$ may be generated, for example, from the filter coefficients based on a selected filter model, for example from the amplitude and phase filter coefficients $a_m$, $b_n$ as defined by equation 9. This may be done using a frequency response generation module 232, which obtains the filter coefficients from the filter controller 165. In another embodiment, the frequency response generation module 232 may be included in the filter controller 165.

Figure 8:
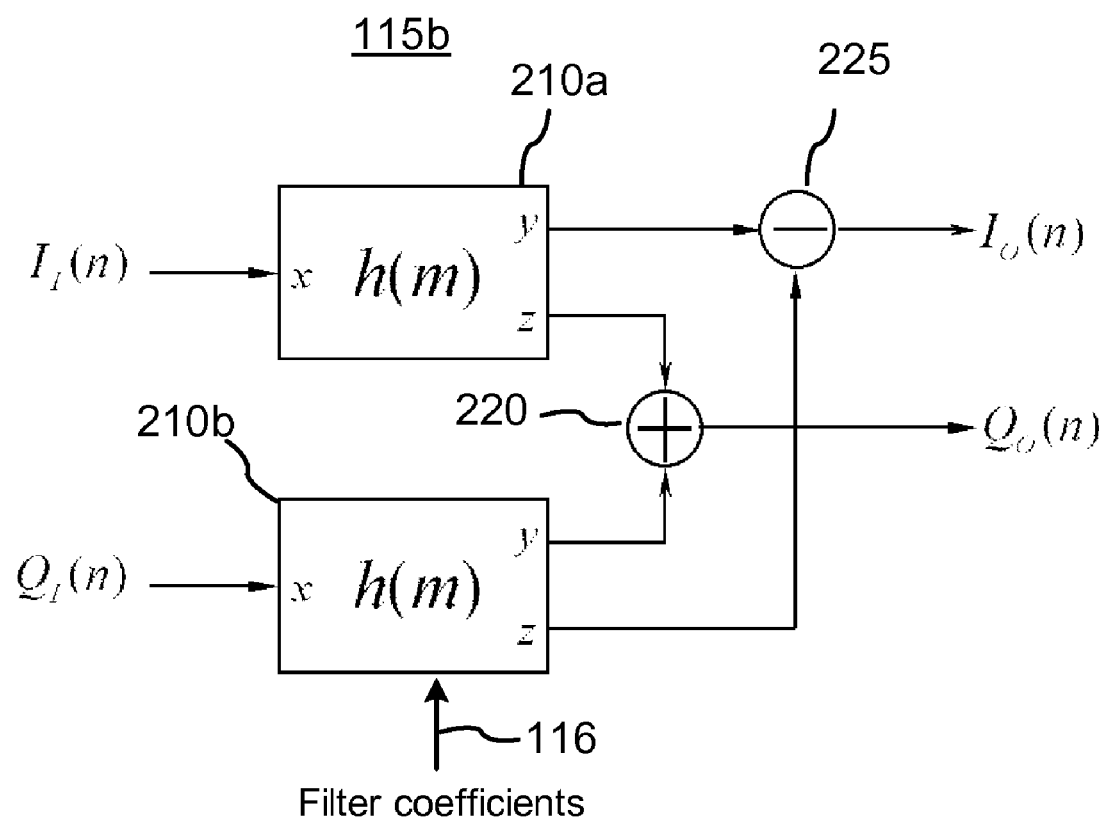
FIG. 8 is a block diagram of a time-domain equalizing FIR filter.

Referring now to FIG. 8, in another embodiment the EQ filter 115 is implemented using a time-domain finite impulse response (FIR) filter 115b, which may include two identical FIR filter blocks 210a and 210b connected in parallel to receive the input digital signals $I_I(n)$ and $Q_I(n)$, respectively. The FIR filter blocks 210a and 210b have two output ports labeled "y" and "z", which are cross-coupled as shown in the figure using an adder 220 and a subtractor 225 to form two output ports for providing the output digital I and Q signals $I_O(n)$ and $Q_O(n)$.

In operation, FIR filter 115b receives a set of filter coefficients from the FC 165 in the form of a set of complex-valued tap coefficients $h(m)=h_m^r+jh_m^i$, $m=1, 2, \ldots M$, and apply these coefficients to the input digital signals $I_I(n)$ and $Q_I(n)$ to obtain the output digital I and Q signals $I_O(n)$, and $Q_O(n)$. This operation can be described by the following equation 13:

$$I_O(n) + jQ_O(n) = \sum_{m=1}^{M} h(m)(I_I(n-m) + jQ_I(n-m)) \quad (13)$$

$$= \sum_{m=1}^{M} h(m)I_I(n-m) + j\sum_{m=1}^{M} h(m)Q_I(n-m)$$

$$= \left(\sum_{m=1}^{M} h_m^r I_I(n-m) - \sum_{m=1}^{M} h_m^i Q_I(n-m)\right) +$$

$$j\left(\sum_{m=1}^{M} h_m^r Q_I(n-m) + \sum_{m=1}^{M} h_m^i I_I(n-m)\right)$$

Figure 9:
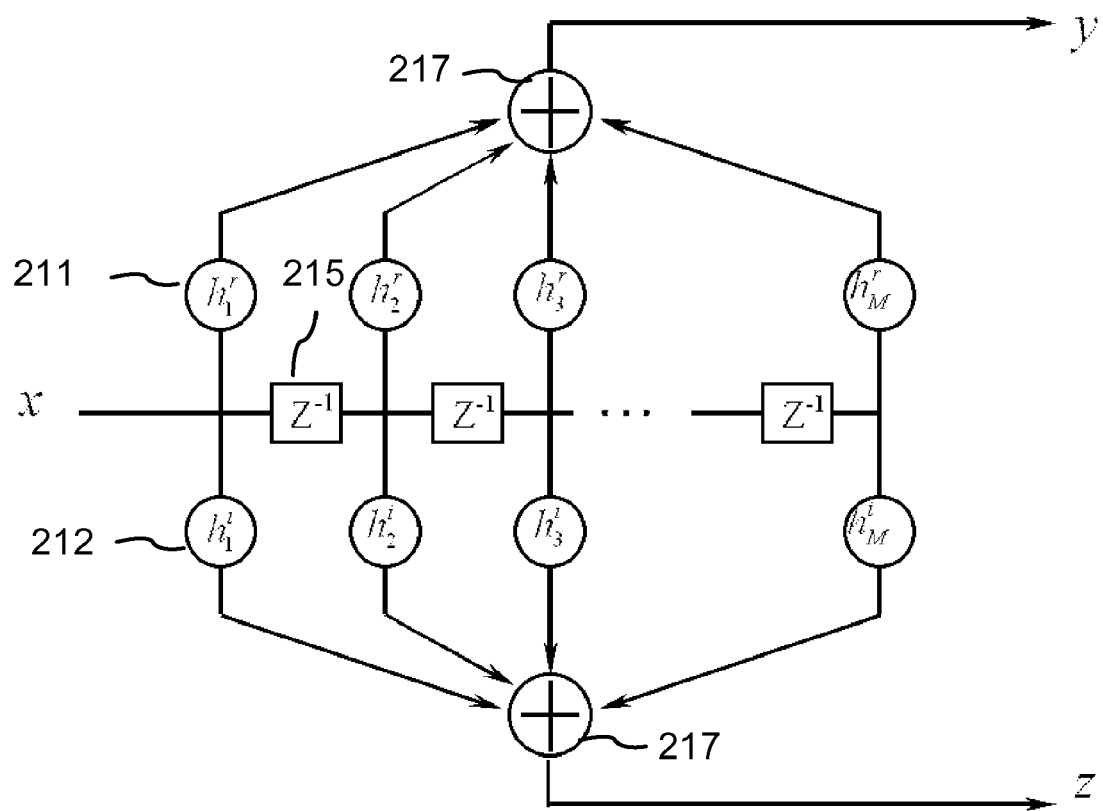
FIG. 9 is a block diagram of one FIR block of the time-domain equalizing FIR filter of FIG. 8.

The FIR filter blocks 210a and 210b, which functional block diagram is illustrated in FIG. 9, includes two sets of M taps with elements 211 and 212 representing real and imaginary parts of the complex tap coefficients h(m), M delay lines 215, e.g. in the form of shift registers, each for delaying a received signal by one symbol interval, and two adders 217 for performing the summations shown in parentheses in the right hand side of equation (13). The complex tap coefficients h(m) may be generated from the amplitude and phase filter coefficients $a_m$ and $b_n$ at the FC 165, or alternatively at the EQ filter 115.

The tap coefficients of the FIR filter may be obtained from the frequency domain response $C(f|a_m, b_n)$, for example, by first computing discrete frequency response $C(f_i|a_m, b_n)$ using current values of the filter coefficients $a_m$, $b_n$, performing an inverse FFT thereof to obtain a time domain response in the form of a sequence of time domain coefficients, shifting the time domain response circularly by one half of the sequence length, so that the time domain response energy is concentrated at the centre of the sequence, and selecting non-zero time domain coefficients in a central portion of the obtained sequence with most of the energy as the complex tap coefficients of the FIR filter. Note that, since the equalization filter response $C(f|a_m, b_n)$ is not symmetrical around the centre frequency, the time domain response is complex-valued and asymmetrical, yielding a complex valued and asymmetrical FIR filter implementation. We found, that a 32-tap FIR is often sufficient to represent the desired frequency-domain response with suitable accuracy.

Figure 10:
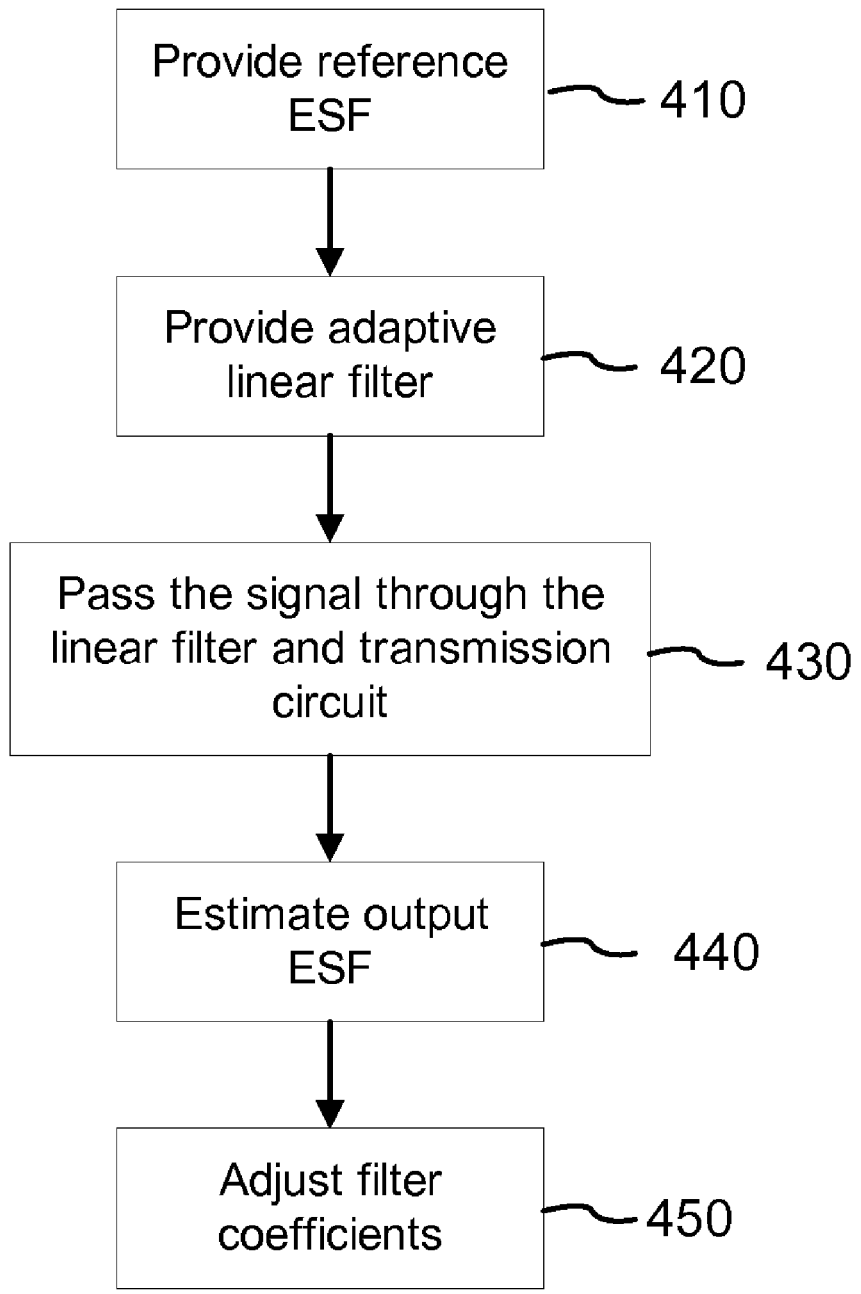
FIG. 10 is a flow-chart illustrating general steps of the method of the present invention for compensating the linear in-band distortion.

Referring to FIG. 10, the method of the present invention for compensating linear in-band distortions experienced by a modulated signal in a communication path includes the following general iterative steps:

In step 410, providing a reference ESF for the modulated signal;

In step 420, providing a linear filter having a frequency response defined by a set of adjustable filter coefficients, such as the amplitude and phase filter coefficients $\{a_m, b_n\}$;

In step 430, passing the modulated signal through the linear filter and the communication path to obtain an output signal;

In step 440, estimating an output ESF from the output signal, which may include sampling the output signal; and, In step 450, adjusting one or more of the filter coefficients of the linear filter so as to decrease a difference between the reference ESF and the output ESF.

The sequence of steps 430, 440 and 450 may be performed iteratively, so that different sets of filter coefficients are tried and those corresponding to comparatively smaller differences between the reference ESF and the output ESF selected at each iteration. The step 450 may be performed by the FC 165, and may include determining an objective function value (OFV) from the reference ESF and the output ESF; and, determining the filter parameters which, when uploaded to the EQ filer 115, reduce the over-all in-band distortion of the output RF signal.

Figure 11:
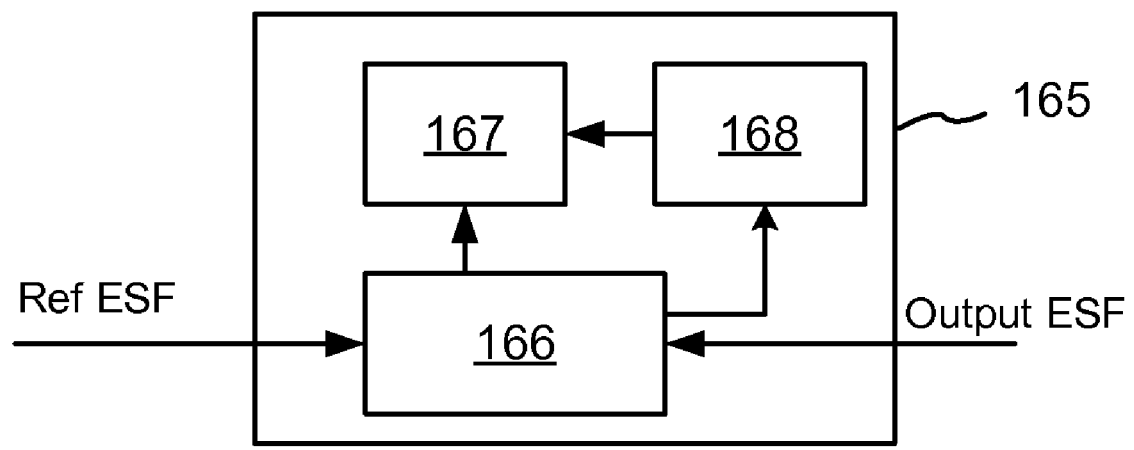
FIG. 11 is a schematic block diagram illustrating one embodiment of the filter controller shown in FIG. 2.
Figure 12A:
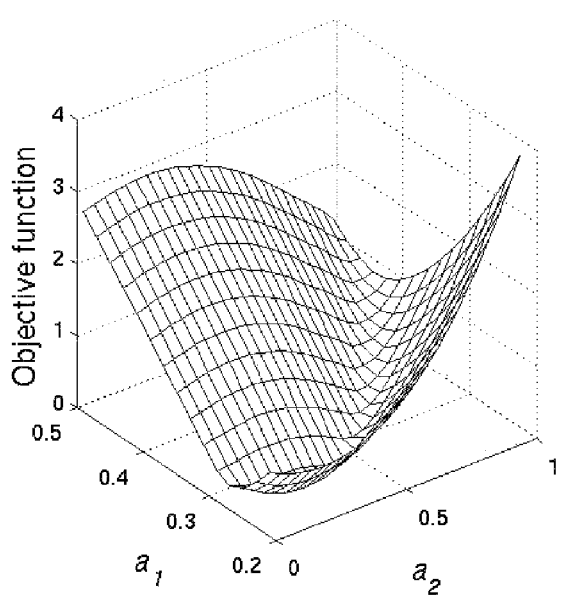
FIGS. 12A and 12B are graphs illustrating the objective function in dependence on the amplitude filter coefficients in the presence of the amplitude distortion as shown in FIG. 4.
Figure 12B:
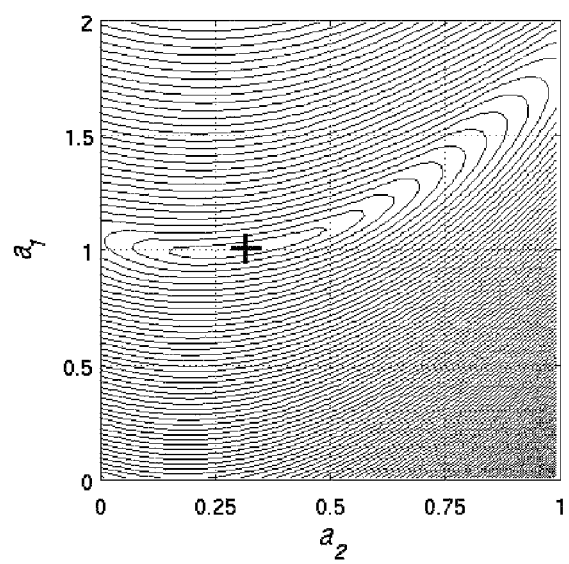

Referring to FIG. 11, according to one embodiment of the invention the FC 165 includes an ESF comparator 166, also referred to as an objective function generator (OFG), a filter coefficients generator (FCG) 167 for generating filter coefficients based on one or more objective function values, and a memory unit 168 for storing one or more objective function values.

In operation, the comparator 166 receives the reference ESF and the output ESF and computes a value of an objective function Obj that represents a difference between the reference ESF and the output ESF. The objective function value may for example be computed as a mean square difference between the output ESF and the reference ESF. By way of example, in embodiments wherein the output and reference ESFs are in the form of $CDF_{actual}$, and $CDF_{ideal}$, the objective function may be determined according to the following equation 14:

$$Obj(a_m, b_n) = \sum_{k=1}^{K} (CDF_{actual}(k) - CDF_{ideal}(k))^2. \quad (14)$$

Here, the notation $Obj(a_m, b_n)$ indicates that the objective function Obj is a function of a current set of filter coefficients $\{a_m, b_n\}$ that define the current frequency response of the EQ filter 115 that corresponds to the output ESF $CDF_{actual}$. When the frequency response of the EQ filter 115 is changed, the objective function value (OFV) computed by the OFG block 166 is generally changed as well. The OFV generated by the OFG block 166 is provided to the FCG 167 for generating a new set of filter coefficients based on the OFV obtained from the OFG 166 in the current iteration, and a saved OFV, which was generated by the FCG 167 in the previous iteration and saved in the memory 168. The current OFV is then saved in the memory 168 for use in the next iteration.

Figure 13A:
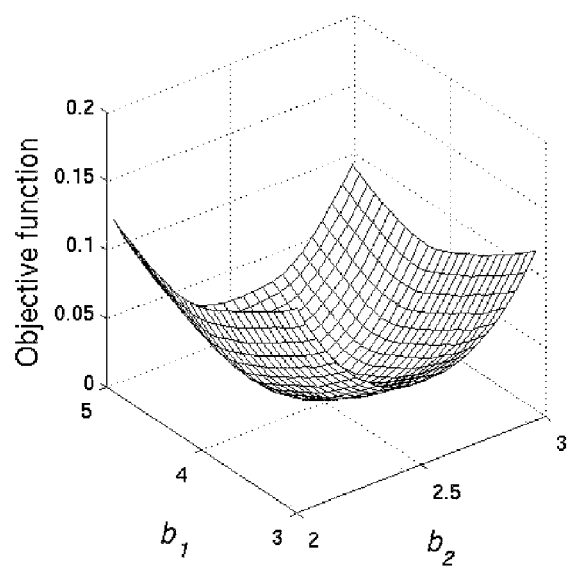
FIGS. 13A and 13B are graphs illustrating the objective function in dependence on the phase filter coefficients in the presence of the phase distortion as shown in FIG. 4
Figure 13B:
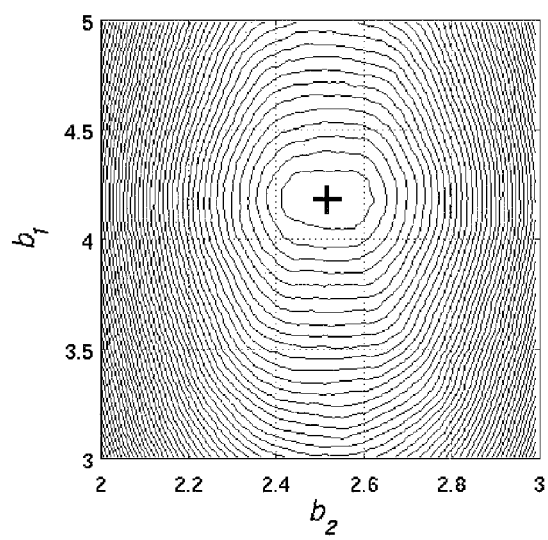

By way of example, FIGS. 7A, 7B provide an isometric view and a contour plot of the objective function defined by equation (14) in dependence upon the amplitude filter coefficients $a_1$ and $a_2$ when the in-band distortions have only the amplitude components of the first and second order, as defined by equation (4), with values given hereinabove with reference to FIGS. 3-6. Similarly, FIGS. 13A, 13B provide an isometric view and a contour plot of the objective function in dependence upon the phase filter coefficients $b_1$ and $b_2$ when the in-band distortions have only the phase components of the first and second order, as defined by equation (5). Advantageously, the shown 3D objective functions defined by equation (14) have a smooth surface with a single minimum corresponding to a full compensation of the corresponding in-band distortions in the RF circuit, as can be clearly seen from the FIGS. 12A-13B.

Other statistical functions or characteristics of the modulation signal envelope, such as statistical moments or cumulants, may also be used as the ESF for computing the objective function. By way of example, in one embodiments the reference and output ESFs are computed as statistical moments of the fourth order of respective pluralities of the output and reference signal samples, and the objective function is estimated as an absolute value of their difference, in accordance with the following equation:

$$Obj(a_m, b_n) = \frac{1}{L_s}\sum_{l=1}^{L_s} |s^4(l) - s_0^4(l)|. \quad (15)$$

Here, $L_s$ is the number of samples used to compute the respective ESFs, and $s(l)$ and $s_0(l)$ are the output and reference samples that are normalized such that their average power is 1.

A set of filter coefficients $\{a_m, b_n\}$ that substantially minimizes the objective function, such as that defined by equations (14) or (15), provides a frequency response of the EQ filter 115 that substantially compensates for the overall in-band signal distortions in the RF circuit 130. Accordingly, the task of compensating the in-band linear distortions may be achieved by iteratively adjusting the filter coefficients so as to reduce the objective function $Obj(a_m, b_n)$, looking for a minimum thereof. Various prior-art minimization techniques can be used to find the location of the minimum, said location providing estimates of the optimal values of the filter coefficients $\{a_m, b_n\}$; one skilled in the art would be able to select a suitable minimization technique given constraints of a particular implementation.

The steps of determining optimal values of the filter coefficients so as to substantially minimize the objective function are performed iteratively until a predetermined condition is satisfied, e.g. the objective function reaches a pre-defined threshold value, or a pre-defined maximum number of iterations is reached. In other embodiments, the iterations can continue indefinitely during normal operation of the transmitter 100 to adaptively adjust the circuit's parameters to changing environmental conditions.

Figure 14:
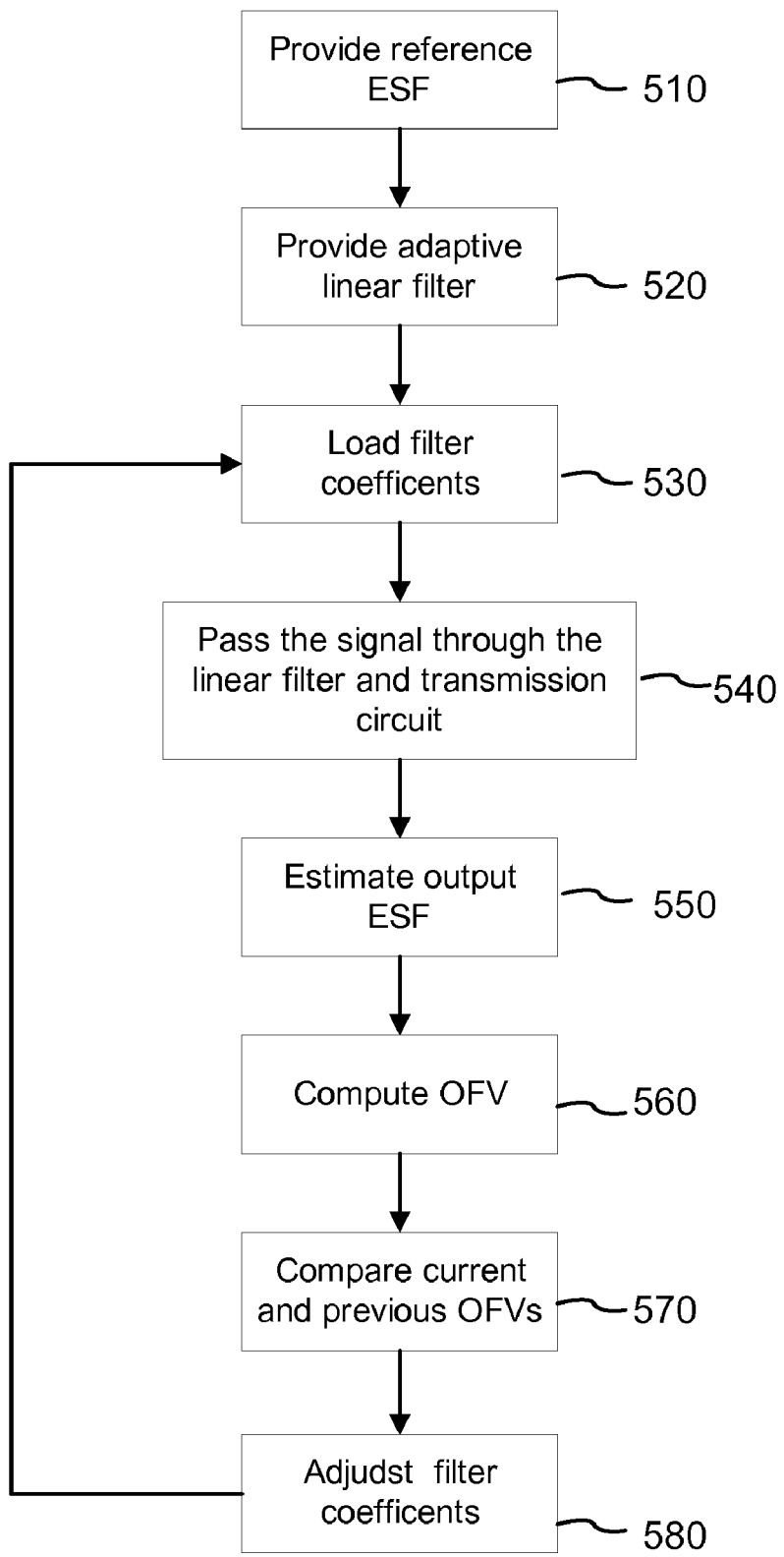
FIG. 14 is a flow chart illustrating one embodiment of the method of the present invention for iteratively compensating the linear in-band distortion using the adaptive linear equalization filter.

Accordingly, the method of the present invention in one embodiment thereof is as illustrated in FIG. 14, and includes the following steps:

providing a linear filter having a frequency response defined by a set of adjustable filter coefficients in step 520, such as the EQ filter 115 of FIG. 2;

providing a reference ESF for the modulated signal in step 510 to the ESF comparator 166;

providing a first set of filter coefficients to the linear filter in step 530; in a first iteration, a set of pre-determined initial filter coefficients may be loaded so as to initialize the adaptive linear filter in such a way that the filter provides a predetermined frequency response. The initial filter coefficients may be determined at a transmitter calibration stage, or may simply correspond to a flat frequency response, which in turn corresponds to setting each of the amplitude and phase filter coefficients in equation (9) to zero, $a_m=b_n=0$ for all values of the indices m and n;

in step 540, passing the modulated signal through the linear filter and the communication path to obtain an output signal;

estimating an output ESF for the output signal in step 550; this step may include sampling the output signal 173 to determine the output ESF;

in step 560, obtaining a first objective function value $OFV_1$ based on the output ESF and the reference ESF, and saving said first objective function value in memory (168); in the first iteration, the method proceeds to step 580 wherein one or more of the filter coefficients are adjusted to obtain a second set of filter coefficients, which are then loaded into the linear filter (115) to adjust its frequency response, after which steps 540, 550, and 560 are repeated to obtain a second objective function value $OFV_2$;

for consecutive iterations, the method proceeds to step 570, which includes comparing the first objective function value $OFV_1$ obtained in the preceding iteration and saved in memory, and the second objective function value $OFV_2$ obtained in the current iteration;

in step 580, based on results of the comparing operation in step 570, adjusting the filter coefficients to generate a third set of filter coefficients, and providing said third set of filter coefficients to the linear filter so as to reduce a difference between the reference ESF and the output ESF obtained in a next iteration.

To find a set of filter coefficients that substantially minimizes the objective function, or reduces it to below a predetermined threshold, various minimization techniques may be implemented, including but not limited to an alternate one-dimensional search wherein a single filter coefficient is adjusted in each iteration, and the method of steepest descent wherein several or all of the filter coefficients may be adjusted in a single iteration, as described in further detail in published U.S. Patent Application 2008/0143562, which is incorporated herein by reference.

By way of example, in an embodiment of the invention that is based on an alternate one-dimensional (1D) search, the following steps may be performed by the transmitter 100 during operation thereof:

a) the EQ filter 115 is initialized with a set of pre-determined filter coefficients, for example to provide a flat frequency response corresponding to $a_m=0$ and $b_n=0$ in the filter model of equation (9);

b) the modulated signal at the output of the RF circuit 130 is sampled, and a plurality of output samples is provided to the ESF generator to generate the output ESF, which is then provided to the FC 165 for generating an objective function value, which is saved in memory;

c) a filter coefficient is selected;

d) the selected filter coefficient is incremented by a suitable non-zero value while keeping all other filter coefficients unchanged, and a corresponding set of adjusted filter coefficients is provided to the EQ filter 115 so as to correspondingly adjust its frequency transfer function;

e) (b) is repeated to obtain a new objective function value; if the new objective function has decreased, proceed to (g); otherwise the selected filter coefficient is decremented by a suitable non-zero value relative to its value prior to (c) while keeping all other filter coefficients unchanged, and a corresponding set of adjusted filter coefficients is provided to the EQ filter 115 so as to correspondingly adjust its frequency transfer function;

f) (b) is repeated to obtain a new objective function value; if the new objective function has decreased, proceed to (g) while keeping the current value of the selected filter coefficient in memory; otherwise the selected filter coefficient is reset to its value prior to (c) while keeping all other filter coefficients unchanged, and a corresponding set of adjusted filter coefficients is provided to the EQ filter 115 so as to correspondingly adjust its frequency transfer function;

g) a next filter coefficient from the set of filter coefficients is selected; and h) steps (d)-(g) are repeated for each of the filter coefficients from the set;

i) steps (c)-(h) are iteratively repeated.

The iterations may be stopped when a pre-determined condition is reached, for example, when the objective function reaches a pre-determined threshold value.

In the transmitter 100, the reference ESF is assumed to be known a-priori and is saved, for example at the time of the transmitter calibration, in the ESF memory 190. In other embodiments, the reference ESF may be obtained in operation by tapping off a portion of the modulated signal prior to passing thereof through the communication path that introduces the in-band distortions that are to be compensated, for example using a coupler operatively coupled between the input port and the communication path.

Figure 15:
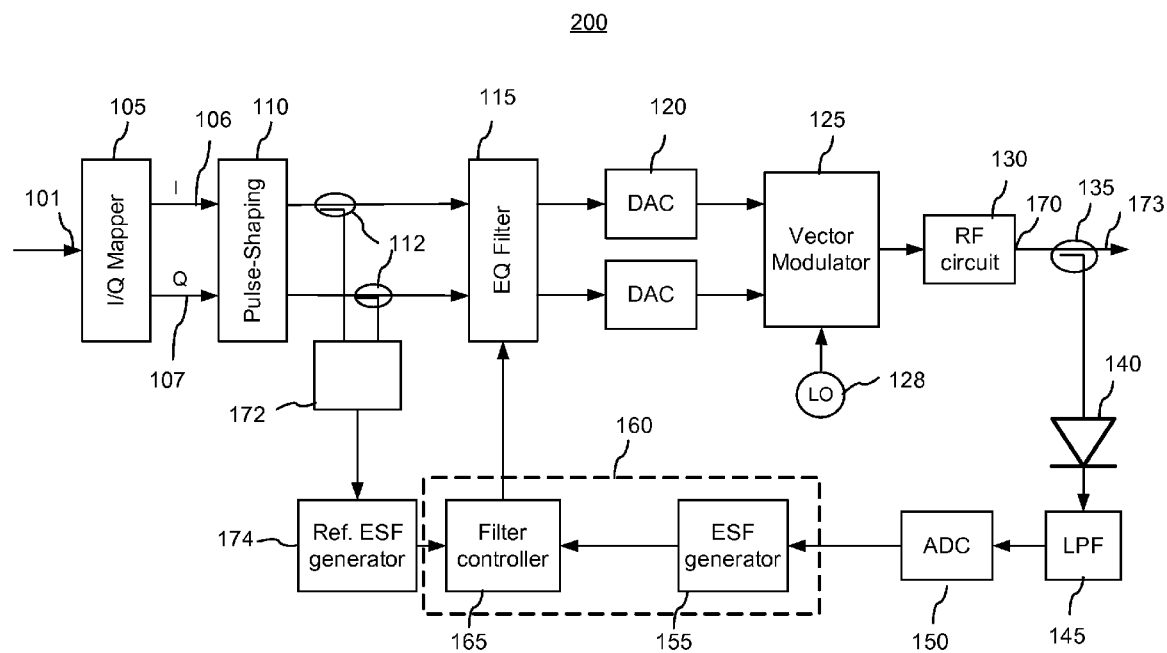
FIG. 15 is a diagram of a transmitter incorporating an equalizing linear filter, a filter control circuit and a reference circuit for obtaining a reference envelope statistical function from a digital reference signal according to one embodiment of the present invention.

Referring now to FIG. 15, one such exemplary embodiment is illustrated in the form of a transmitter 200. Elements of the transmitter 200 of FIG. 14 that are similar or identical to elements of the transmitter 100 of FIG. 2 are labeled with same reference labels and are not described here again. The transmitter 200 is substantially identical to the transmitter 100 in all respects, except that the reference circuit that provides the reference ESF to the processor 160 now includes a dual coupler 112 coupled at the input of the EQ filter 115 for taping off portions of the modulated digital I and Q signals, a reference signal generator (RSG) 172 for generating a reference signal $S_r$ from the tapped off I and Q signals, and a reference ESF generator 174 for generating the reference ESF from the reference signal. Since the I and Q signals are digital signals composed of streams of symbols I(n) and Q(n), n=1, 2 . . . , the reference circuit does not require an ADC in this embodiment. The reference signal generator 172 preferably generates the reference signal in accordance with the envelope detection approach used by the envelope detector 140 of the filter control circuit. In the embodiment described herein, the envelope detector 140 is a square-law power detector, and the reference signal $S_r$ generated by 172 is in the form of a sequence of reference samples $S_r(n)=I^2(n)+Q^2(n)$. The reference ESF generator 174 collects a plurality of the reference samples $S_r(l)$, $l=1, \ldots, L_{ref}$, and computes therefrom the reference ESF using a substantially same algorithm that used by the ESF generator 155 for generating the output ESF. The plurality of the reference samples $S_r(l)$ used to compute the reference ESF preferably spans multiple symbol periods, and maybe obtained by sampling the I an Q signals at a rate that is lower than the data rate R. The number of reference samples $L_{ref}$ used to compute the reference ESF is preferably greater than 1000, and may be in the order of 10,000 or more.

In other embodiments, the reference ESF may be generated by tapping off a portion of the modulated signal after passing thereof through the EQ filter 115, both before and after the VM 125.

Figure 16:
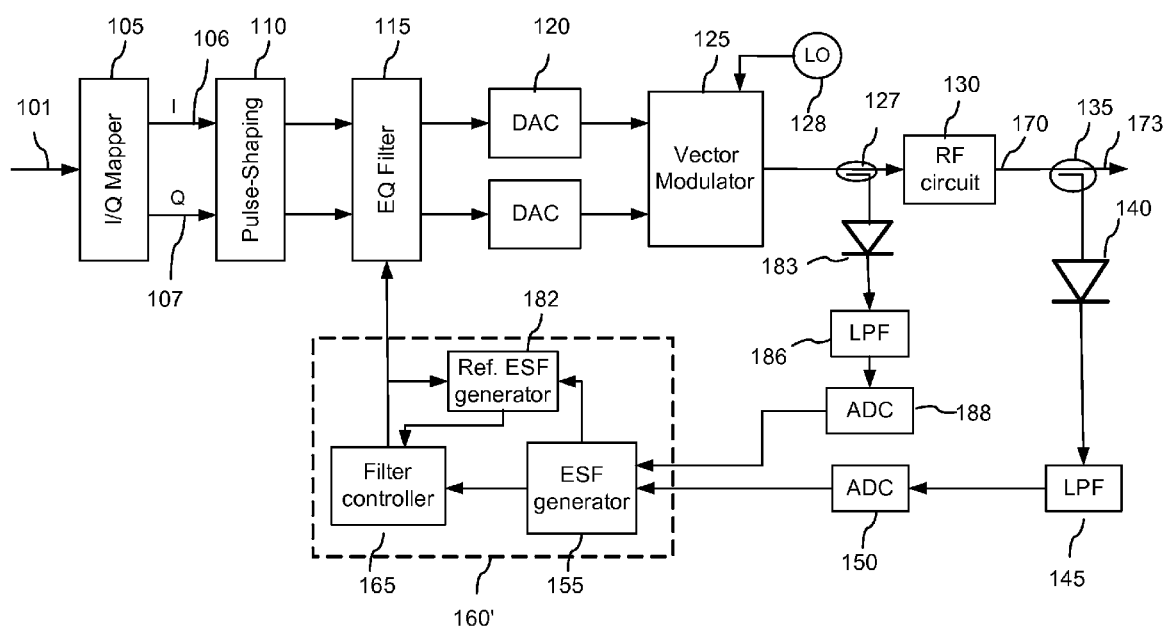
FIG. 16 is a diagram of a transmitter incorporating an equalizing linear filter, a filter control circuit and a reference circuit for obtaining a reference envelope statistical function from an analog reference signal according to one embodiment of the present invention.

By way of example, FIG. 16 illustrates one such embodiment in the form of a transmitter 300, wherein the reference ESF is estimated from the modulated signal after it has been converted into an analog signal and frequency up-converted with the VM 125, but prior to passing thereof through the RF circuit 130. Elements of the transmitter 300 of FIG. 15 that are similar or identical to elements of the transmitter 100 of FIG. 2 are labeled with same reference labels, and are not described here again. The transmitter 300 is substantially identical to the transmitter 200 in all respects, except that the reference circuit that provides the reference ESF now includes a tap coupler 127 that is coupled at the output of the VM 125, for taping off a portion of the modulated RF signal. The tap port of the coupler 127 connects to a second sampling circuit, which generates from the tapped-off signal a plurality of reference signal samples, and includes a second envelope detector 183 that is similar to the first envelope detector 140, a second LPF filter 186 similar to the LPF filter 145, and a second ADC 188. This plurality of reference signal samples is then provided to the ESF generator 155, which generates therefrom an ESF that will be referred to herein as the filtered ESF, in the same way as the output ESF is generated from the plurality of output signal samples. The filtered ESF is then provided to a reference ESF generator 182, which generates therefrom an estimate of the reference ESF based on a known frequency response of the EQ filter 115, for example using the filter coefficients obtained from the FC 165.

By way of example, in one embodiment the ESF generator 155 is programmed for generating CDFs from pluralities of received signal samples as described hereinabove in the specification, and in operation generates the filtered ESF in the form of a filtered CDF $CDF_{eq}(n)$. The processor 160 may then implement the following algorithm for estimating the reference ESF $CDF_r(n)$.

First, a mapping function F(n) that relates the reference and filtered CDFs is obtained using the following steps based on a known state of the linear EQ filter 115:

generate a plurality of samples of a calibration signal of a known modulation format, for example QPSK with square root raised cosine filtering with roll off of 0.35, and save them in memory;

compute from these calibration samples a corresponding CDF, which may be denoted as $CDF_{known}$, and save it in memory;

pass the calibration samples through a linear filter having a frequency transfer function that is identical to that of the EQ 115 at the time of measurement, to obtain a plurality of samples of the filtered calibration signal;

generate a CDF of the plurality of samples of the filtered calibration signal, which may be denoted $CDF_{gen}$;

estimate the mapping function F(n) based on $CDF_{known}$, and $CDF_{gen}$, for example according to the following equation:

$$F(k) = \frac{CDF_{gen}(k)}{CDF_{known}(k)}, k = 1, 2, \ldots, K,$$

where K is the number of bins used in the CDF estimation;

Estimate the reference CDF using the mapping function and the filtered CDF, for example according to the following equation:

$$CDF_r(k) = \frac{CDF_{eq}(k)}{F(k)}, k = 1, 2, \ldots, K$$

Figure 17:
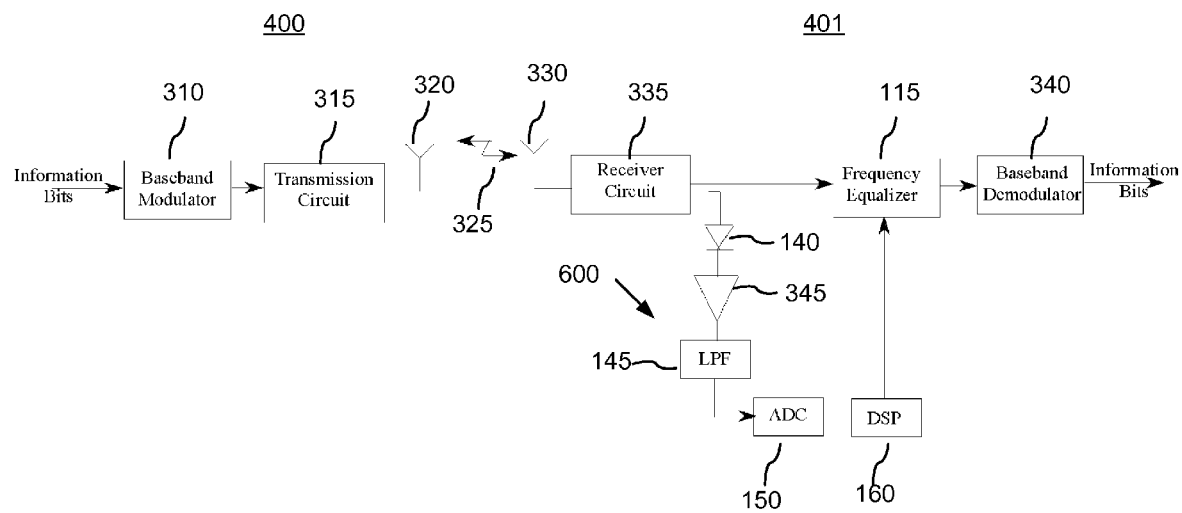
FIG. 17 is a diagram of a wireless communication system having an equalizing linear filter and a filter control circuit at the receiver.
Figure 18:
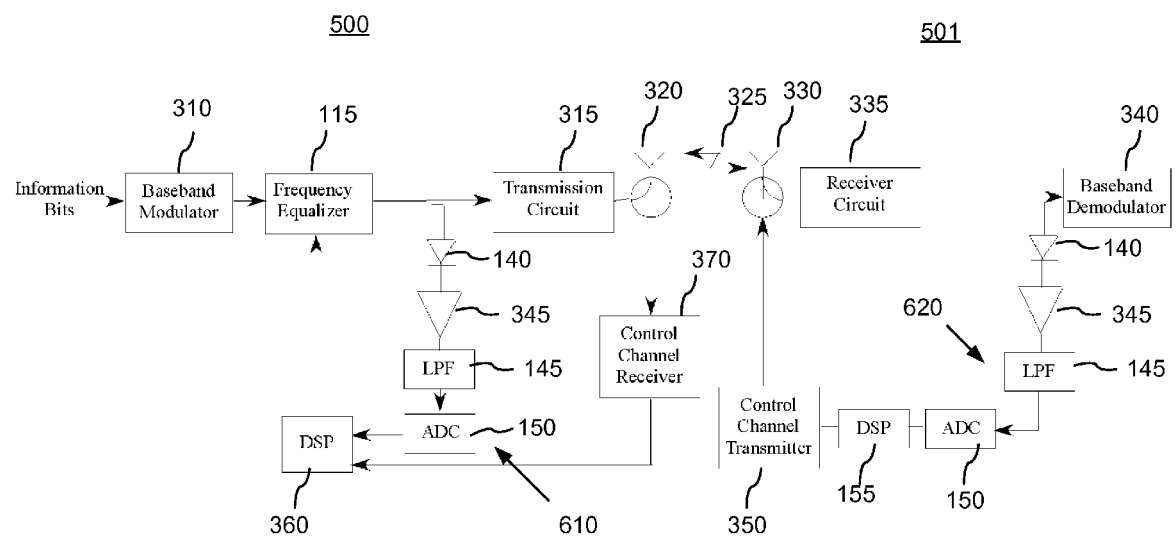
FIG. 18 is a diagram of a wireless communication system having an equalizing linear filter and one portion of the filter control circuit at the receiver, and an equalizing linear filter and a second portion of the filter control circuit at the transmitter.

In a communication system that includes a transmitter for transmitting a modulated signal and a receiver for receiving said signal, the method of the present invention may be implemented in a variety of ways, and may be used to compensate for in-band distortions that occur in both the transmitter and the receiver, and in a communication link therebetween. This may be accomplished, for example, by disposing the EQ filter 115 and/or at least a portion of the filter control circuit that generates the output ESF at the receiver instead of the transmitter. FIGS. 17 and 18 schematically illustrate two different embodiments of such communication system.

Referring first to FIG. 17, a communication system according to one embodiment of the invention is shown; it includes a wireless transmitter 400 and a wireless receiver 401 that are connected by means of a wireless communication link 325 using antennas 320 and 330. The transmitter 400 may be substantially the same as the prior art transmitter 10 shown in FIG. 1. It includes a baseband modulator 310, a transmission circuit 315 and the antenna 320. The baseband modulator 310 may include the I/Q mapper 105 the pulse-shaping filter 110, and the D/A converters 120 shown in FIGS. 1, 2, 15 and 16. The transmission circuit 315 may include the VM 125 and the RF circuit 130. The receiver 401 includes the antenna 330 for receiving the modulated signal from the wireless channel 325, which connects to a receiver circuit 335, followed by the EQ filter 115 and a based-band demodulator connected in series. The receiver circuit 335 and the baseband demodulator 340 are parts of a conventional wireless receiver as known in the art and will not be described herein in detail. Typically, the receiver circuit 335 includes one or more amplifiers, one or more frequency down-conversion stages to bring the received modulated signal to the baseband, and one or more filters. The baseband demodulator 340 operates inversely to the baseband modulator 310 as known in the art. An ADC may be provided, for example at the input to the EQ filter 115, or in other embodiments at the output of the receiver circuit 335, to convert the received signal to digital format.

Differently from the transmitter 200 of FIG. 2, which utilizes the EQ filter 115 to pre-distort the modulated signal prior to propagation thereof through circuits that introduce in-band distortions to be compensated, in this embodiment the receiver 401 utilizes the EQ filter 115 for post-compensation of in-band distortions that occur in the communication path between the baseband modulator 310 and the baseband demodulator 340, which in this case includes the transmission circuit 315, the wireless channel 325, and the receiver circuit 335. Nevertheless, the EQ filter 115 in the receiver 401 may be controlled in substantially the same way as in the transmitter 100, using a filter control circuit 600 that is substantially identical to the filter control circuit 180 of the transmitter 100. In the receiver 401, the filter control circuit 600 is connected between an output of the receiver circuit 335, from which an output signal to be sampled is received to determine the output ESF, and the control port of the EQ filter 115. The filter control circuit 600 operates in substantially the same way as described hereinabove with reference to FIGS. 2-14.

In the embodiment of FIG. 17, the reference ESF is assumed to be known, and may be saved, for example, in an on-board memory of the processor 160. It may also be obtained at the transmitter using a reference circuit as described hereinabove with reference to FIG. 15 or 16, and may be transmitted to the receiver 401, for example over a control channel using the communication link 325.

In other embodiments, both the reference circuit for obtaining the reference ESF and the EQ filter 115 may be located at the transmitter, while the filter control circuit may have a portion that is located at the receiver, and a portion that is located at the transmitter, which are coupled using a control channel over the wireless link 325.

One such embodiment is illustrated in FIG. 18, which schematically shows a wireless communication system with a transmitter 500 and a receiver 501. In FIG. 18, elements that are functionally identical to elements shown in preceding drawings are indicated with same reference labels and are not further described hereinbelow. The receiver 501 generates the output ESF and provides it over a control channel to the transmitter 500. For this purpose, the receiver 501 has a control channel transmitter 350 while the transmitter 500 has a control channel receiver 370. Control channel receivers and transmitters for communicating control type information from a wireless receiver to a wireless transmitter are well known in the art, and selecting suitable implementations thereof for use in the present invention is an engineering task within the level of ordinary skill in the art.

The receiver 501 includes a first portion 620 of the filter control circuit, which is coupled at the output of the receiver circuit 335 to receive an output signal therefrom, and generates an output ESF as described hereinabove. Similarly to the filter control circuit 180 of the transmitter 180, the first portion 620 of the filter control circuit in this embodiment includes an envelope detector 140, an optional amplifier 345, an LPF 145, and an ADC 150, which together form a sampling circuit that connects to an ESF generator 155 and provides thereto a stream of signal samples. The output ESF generated by the ESF generator 155 is passed to the transmitter 500 over the control channel via the control channel transmitter 350 and the control channel receiver 370. At the wireless transmitter 500, the control channel receiver 370 is operatively connected to a processor 360, which is similar to the processor 160 of the transmitter 300, and is linked to the control port of the EQ filter 115, forming a second portion of the filter control circuit for controlling the EQ filter 115 so as to compensate for the in-band distortions in the communication path. The transmitter 500 further includes an optional reference circuit 610 which is substantially identical to the reference circuit 183-186-188 of FIG. 16, and in operation generates a plurality of reference signal samples, which are then processed in the processor 360 to obtain the reference ESF, in the same way as described hereinabove with reference to FIG. 16.

Figure 19:
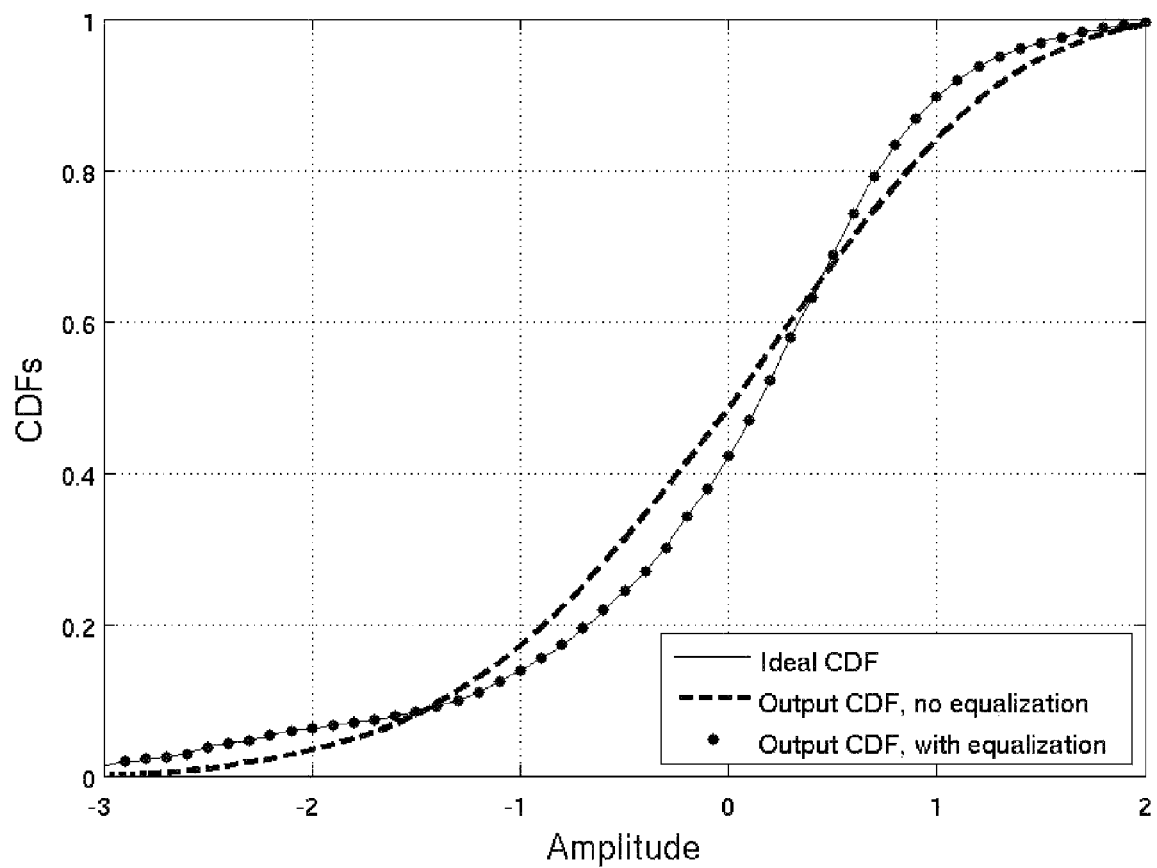
FIG. 19 is a graph illustrating the envelope cumulative distribution functions for the transmitted RF signal before (dashed) and after (dotted) the iterative distortion compensation using the adaptive linear equalization filter according to the present invention.
Figure 21:
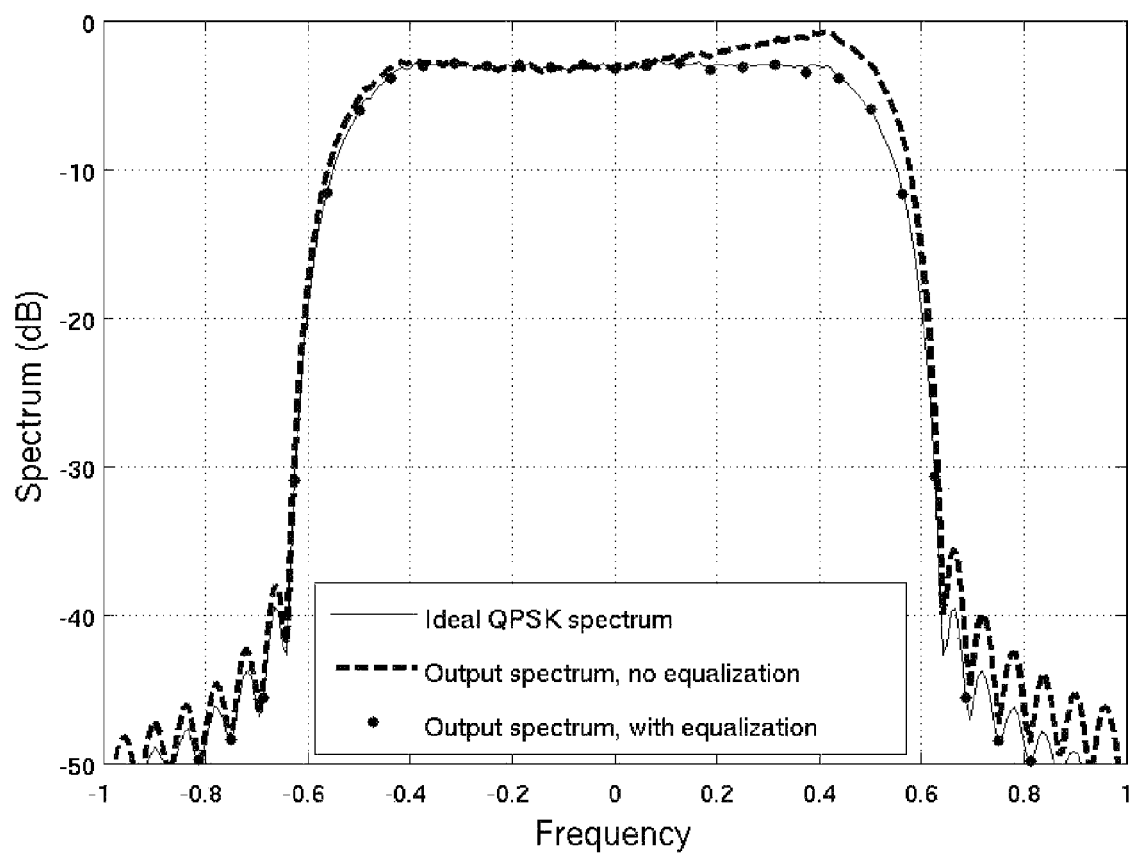
FIG. 21 is a graph illustrating the power spectra for the transmitted RF signal before (dashed) and after (dotted) the iterative distortion compensation using the adaptive linear equalization filter according to the present invention.

FIGS. 19-21 provide exemplary simulation results illustrating performance of the aforedescribed method and circuit for compensation of linear in-band distortions. In the simulation, a QPSK signal with square-root-raised cosine filtering and roll off of 0.25 is transmitted through the RF circuits with the in-band response shown in FIG. 4. The amplitude and phase responses of the equalization filter are each modeled by a polynomial of order 6. The resulting equalization filter is implemented as a time-domain FIR filter as illustrated in FIGS. 8 and 9 having 32 taps. The CDFs are calculated with 400,000 samples using a histogram of 100 bins.

In FIG. 19, the output CDF without the EQ filter is shown with a dashed line, the output CDF with the EQ filter in the signal path having the filter coefficients determined using the aforedescribed iterative process, termed "equalization", is shown with solid dots, and the ideal CDF in the absence of the distortion is shown with a thin solid line. We observe that the resulting EQ filter eliminates the distortion due to the RF circuit impairment and restores the CDF to the ideal one as desired. FIGS. 20A and 20B show the associated eye diagrams where the EVM decreases from more than 30% without the EQ filter to less than 1% with the EQ filter derived using the aforedescribed iterative approach. FIG. 21 illustrates the power spectra of the output RF signal with and without the equalization in comparison with the ideal spectrum in the absence of the distortions, showing that the distortion compensation method of the present invention substantially eliminates the effect of distortions on the spectrum.

Advantageously, the aforedescribed method and circuit of the present invention for compensating in-band linear distortions of RF circuits based on statistics of the modulation signal envelope can be used during normal operation of the circuit thus allowing it to adapt to changing conditions without service interruptions; further it utilizes signal sampling with a sampling rate that is independent of the signal bandwidth, the sampling does not require synchronization with the transmitted signals. The method enables the use of lower cost devices, and requires only a simple diode-based power sampling circuit without high-speed analog hardware.

It should be understood that each of the preceding embodiments of the present invention may utilize a portion of another embodiment Of course numerous other embodiments may be envisioned without departing from the spirit and scope of the invention.

We claim:

1. A distortion compensation circuit for compensating linear in-band distortion experienced by a modulated signal in a communication path, comprising:
    an input port for providing the modulated signal;
    a linear filter disposed to receive the modulated signal from the input port for adaptively modifying a spectrum of the modulated signal, the linear filter having a control port for receiving a set of filter coefficients defining a frequency response of the linear filter;
    an output port for providing an output signal comprising at least a portion of the modulated signal after the propagation thereof through the communication path and the linear filter;
    a reference circuit for providing a reference envelope statistical function (ESF) for the modulated signal prior to the propagation thereof through the communication path; and,
    a filter control circuit coupled between the output port and the control port of the linear filter for adjusting the frequency response thereof in dependence upon the output signal, said filter control circuit comprising:
        a sampling circuit for sampling at least a portion of the output signal to provide a plurality of signal envelope samples;
        an ESF estimator for estimating an output ESF based on the plurality of signal envelope samples;
        a filter generator for generating the filter coefficients based on the reference ESF and the output ESF, and for providing said filter coefficients to the control port of the linear filter for adjusting the frequency response thereof so as to reduce a difference between the reference ESF and the output ESF.

2. The distortion compensation circuit of claim 1, wherein the communication path comprises analogue electrical circuitry operatively coupled between the linear filter and the output port, which in operation introduces in-band distortion in the modulated signal.

3. The distortion compensation circuit of claim 1, wherein the communication path comprises a wireless communication link between a wireless receiver and a wireless transmitter.

4. A wireless transmitter for transmitting the modulated signal over a wireless channel, the wireless transmitter comprising the distortion compensation circuit and the analogue electrical circuitry of claim 2.

5. A wireless receiver for receiving the modulated signal from a wireless channel, the receiver comprising the distortion compensation circuit of claim 1.

6. The distortion compensation circuit of claim 1, wherein the linear filter comprises one of a frequency-domain filter or a time-domain filter.

7. The distortion compensation circuit of claim 6, wherein the linear filter comprises a FIR filter, and wherein the filter coefficients comprise tap coefficients of the FIR filter.

8. The distortion compensation circuit of claim 1, wherein the reference circuit comprises memory for storing the reference ESF.

9. The distortion compensation circuit of claim 1, wherein the reference circuit comprises a coupler operatively coupled between the input port and the communication path for tapping off a portion of the modulated signal prior to the propagation thereof through the communication path for obtaining a plurality of reference signal samples for computing the reference ESF therefrom.

10. The distortion compensation circuit of claim 1, further including:
    an objective function generator (OFG) coupled to the ESF estimator and the reference circuit for generating an objective function based on the reference ESF and the output ESF; and,
    a memory for storing the objective function coupled to the OFG;
    wherein the filter generator is coupled to said memory and to the OFG for generating adjusted filter coefficients based on stored and current objective function values.

11. A method for compensating in-band distortion experienced by a modulated signal in a communication path, comprising:
    a) providing a reference envelope statistical function (ESF) for the modulated signal;
    b) providing a linear filter having a frequency response defined by a set of filter coefficients;
    c) passing the modulated signal through the linear filter and the communication path to obtain an output signal;

d) estimating an output ESF for the output signal; and, e) adjusting one or more of the filter coefficients of the linear filter so as to decrease a difference between the reference ESF and the output ESF.

12. A method according to claim 11, wherein (c)-(e) are iteratively repeated until a predetermined condition is met.

13. A method according to claim 11, wherein (c) comprises sampling the output signal to obtain a plurality of output signal samples, and estimating the output ESF based on the plurality of output signal samples.

14. A method for compensating linear in-band distortion experienced by a modulated signal in a communication path, comprising:

a) providing a reference envelope statistical function (ESF) for the modulated signal;

b) providing a linear filter having a frequency response defined by a set of filter coefficients;

c) passing the modulated signal through the linear filter and the communication path to obtain an output signal;

d) estimating an output ESF for the output signal; and, e) adjusting one or more of the filter coefficients of the linear filter so as to decrease a difference between the reference ESF and the output ESF;

wherein step e) comprises:

e1) determining an objective function value based on the reference ESF and the output ESF, and saving said value in memory;

e2) varying one or more of the filter coefficients to adjust the frequency response of the linear filter;

e3) repeating (c) and (d) to obtain an updated output ESF;

e4) determining a new objective function value based on the reference ESF and the updated output ESF; and, e5) updating one or more of the filter coefficients of the linear filter in dependence upon a difference between the new and saved values of the objective function.

15. The method according to claim 11, further comprising:

i) sampling the modulated signal prior to passing thereof through the communication path to obtain a plurality of reference signal samples; and, ii) determining the reference ESF based on the reference plurality of signal samples.

16. The method according to claim 11, wherein steps (a)-(e) are performed in a wireless transmitter for transmitting the modulated signal through a wireless communication channel.

17. The method according to claim 15, wherein steps (i) and (ii) are performed in a wireless transmitter for transmitting the modulated signal through a wireless communication channel, and steps (b) and (d) are performed at a receiver for receiving the modulated signal, further comprising transmitting the reference ESF to the receiver.

18. The method according to claim 15, wherein steps (i) and (ii) are performed in a wireless transmitter for transmitting the modulated signal through a wireless communication channel, and step (d) is performed at a receiver for receiving the modulated signal, further comprising transmitting the output ESF to the transmitter.

19. The method according to claim 11, wherein the reference ESF comprises one of: a cumulative distribution function (CDF), a probability density function (PDF), a statistical cumulant, or a statistical moment of the reference signal samples, and wherein the output ESF comprises a same one of: a cumulative distribution function (CDF), a probability density function (PDF), a statistical cumulant, or a statistical moment of the output signal samples.

20. A method for compensating in-band distortion experienced by a modulated signal in a communication path, comprising:

a) providing a reference envelope statistical function (ESF) for the modulated signal;

b) providing a linear filter having a frequency response defined by a set of adjustable filter coefficients;

c) providing a first set of filter coefficients to the linear filter;

d) passing the modulated signal through the linear filter and the communication path to obtain an output signal;

e) estimating an output ESF for the output signal;

f) obtaining a first objective function value based on the output ESF and the reference ESF, and saving said objective function value in memory;

g) providing a second set of filter coefficients to the linear filter, and repeating steps (d)-(f) to obtain a second objective function value;

h) generating a third set of filter coefficients based on the first and second objective function values so as to reduce a difference between the reference ESF and the output ESF.

21. The distortion compensation circuit of claim 1, wherein the sampling circuit is for sampling the output signal at a sampling rate that is smaller than a data rate of the modulated signal.

22. The distortion compensation circuit of claim 1, wherein the output ESF comprises one of:

a cumulative distribution function (CDF) of the plurality of signal samples;

a probability density function (PDF) of the plurality of signal samples;

a statistical cumulant of the plurality of signal samples, or a function thereof; or, a statistical moment of the plurality of signal samples, or a function thereof.

* * * * *